US012580975B2

(12) United States Patent
Adyanthaya et al.

(10) Patent No.: US 12,580,975 B2
(45) Date of Patent: Mar. 17, 2026

(54) METHODS AND SYSTEMS FOR GEOSPATIAL IDENTIFICATION OF MEDIA STREAMS

(71) Applicant: TuneIn, Inc., San Francisco, CA (US)

(72) Inventors: Moksha Adyanthaya, San Francisco, CA (US); Paul Brody, San Francisco, CA (US); Scott Collins, San Francisco, CA (US); Jack Kim, San Francisco, CA (US); Sarah Kate Emerson, San Francisco, CA (US); Yuri Ono, San Francisco, CA (US); Eric Wilcox, San Francisco, CA (US); Richard Stern, San Francisco, CA (US); Nicole Erthein, San Francisco, CA (US); Devki Kalra, San Francisco, CA (US); Joseph King, San Francisco, CA (US); Joseph Gomez, San Francisco, CA (US)

(73) Assignee: TuneIn, Inc., San Francisco, CA (US)

( * ) Notice: Subject to any disclaimer, the term of this patent is extended or adjusted under 35 U.S.C. 154(b) by 429 days.

(21) Appl. No.: 17/989,518

(22) Filed: Nov. 17, 2022

(65) Prior Publication Data

US 2023/0155707 A1     May 18, 2023

Related U.S. Application Data

(60) Provisional application No. 63/296,740, filed on Jan. 5, 2022, provisional application No. 63/296,717, filed
(Continued)

(51) Int. Cl.
H04H 60/54     (2008.01)
G06N 20/00     (2019.01)
(Continued)

(52) U.S. Cl.
CPC ............ *H04L 65/611* (2022.05); *G06N 20/00* (2019.01); *H04H 60/46* (2013.01); *H04H 60/54* (2013.01);
(Continued)

(58) Field of Classification Search
None
See application file for complete search history.

(56) References Cited

U.S. PATENT DOCUMENTS

| 8,504,073 B2 | 8/2013 | Svendsen et al. |
| 8,886,584 B1 | 11/2014 | Kane et al. |
| | (Continued) | |

FOREIGN PATENT DOCUMENTS

| WO | 2016036797 A1 | 3/2016 |
| WO | 2020040778 A1 | 2/2020 |

OTHER PUBLICATIONS

Office Action mailed Jul. 31, 2023 in U.S. Appl. No. 17/989,491.
(Continued)

*Primary Examiner* — Frantz Bataille
(74) *Attorney, Agent, or Firm* — POLSINELLI LLP

(57) ABSTRACT

Systems and methods are provided for identifying broadcast sources within a MapView system. A MapView system may display a first representation of a first geographical area that includes icons representing a location of broadcast sources. User characteristics may be extracted from a first user device associated with the MapView system. A machine-learning model may execute using the user characteristics to generate contemporaneous broadcast characteristics corresponding to a user of the first user device. The MapView system may then display a second representation of the geographical area that includes icons representing a location of different broad-
(Continued)

cast sources. The MapView system may then facilitate a presentation of particular broadcast source from the different broadcast sources.

20 Claims, 10 Drawing Sheets

Related U.S. Application Data on Jan. 5, 2022, provisional application No. 63/280,425, filed on Nov. 17, 2021.

(51) Int. Cl.

| | | |
|---|---|---|
| *H04H 60/46* | (2008.01) | |
| *H04H 60/70* | (2008.01) | |
| *H04L 65/611* | (2022.01) | |
| *H04L 67/12* | (2022.01) | |
| *H04L 67/52* | (2022.01) | |

(52) U.S. Cl.
CPC ............. *H04H 60/70* (2013.01); *H04L 67/12* (2013.01); *H04L 67/52* (2022.05)

(56) References Cited

U.S. PATENT DOCUMENTS

| | | | |
|---|---|---|---|
| 10,083,232 | B1 | 9/2018 | Durham et al. |
| 10,972,206 | B1 | 4/2021 | Calvert et al. |
| 11,388,457 | B2 | 7/2022 | Lee et al. |
| 2011/0035284 | A1 | 2/2011 | Moshfeghi |
| 2011/0066743 | A1 | 3/2011 | Hurley et al. |
| 2011/0238289 | A1 | 9/2011 | Lehmann et al. |
| 2014/0107916 | A1 | 4/2014 | Urup et al. |
| 2015/0185030 | A1 | 7/2015 | Monroe et al. |
| 2016/0246792 | A1 | 8/2016 | Anguiano |
| 2016/0329977 | A1 | 11/2016 | Williams |
| 2019/0253861 | A1 * | 8/2019 | Horelik .............. H04W 64/006 |
| 2019/0268666 | A1 | 8/2019 | Lee |
| 2020/0213643 | A1 | 7/2020 | Jennings et al. |
| 2021/0051358 | A1 | 2/2021 | Liu et al. |
| 2021/0114616 | A1 | 4/2021 | Altman |
| 2021/0160571 | A1 | 5/2021 | Menendez |
| 2021/0281904 | A1 * | 9/2021 | Calvert ........... H04N 21/25841 |
| 2022/0074756 | A1 | 3/2022 | Gewickey et al. |

OTHER PUBLICATIONS

Notice of Allowance mailed Nov. 14, 2023 in U.S. Appl. No. 17/989,491.
Office Action mailed Sep. 12, 2024 in U.S. Appl. No. 18/439,953.
Notice of Allowance mailed Feb. 26, 2025 in U.S. Appl. No. 18/439,953.
Examination Report mailed Jul. 16, 2025 in European Application 22835956.8, 5 pages.
International Search Report and Written Opinion mailed Mar. 16, 2023 in International Application PCT/US2022/050300.
Examination Report mailed Oct. 27, 2025 in European Application 22839549.7, 10 pages.

* cited by examiner

600

Displaying a first representation of a first portion of a geographical area, wherein the first representation includes icons representing locations of a first set of broadcast sources within the first portion of the first geographical area
604

Extracting user characteristics from a first user device associated with the first representation of the first portion of the first geographical area, wherein the user characteristics include geospatial data indicative of a location of the first user device within the geographical area
608

Executing a machine-learning model on the user characteristics, the machine-learning model being configured to generate a prediction of a contemporaneous broadcast characteristics associated with at least one user of the first user device
612

Displaying a second representation of a second portion of a second geographical area based on the contemporaneous broadcast characteristics, wherein the second representation includes icons representing locations of a second set of broadcast sources within the second portion of the second geographical area
616

Facilitating a presentation of media from a particular broadcast source of the second set of broadcast sources
620

FIG. 6

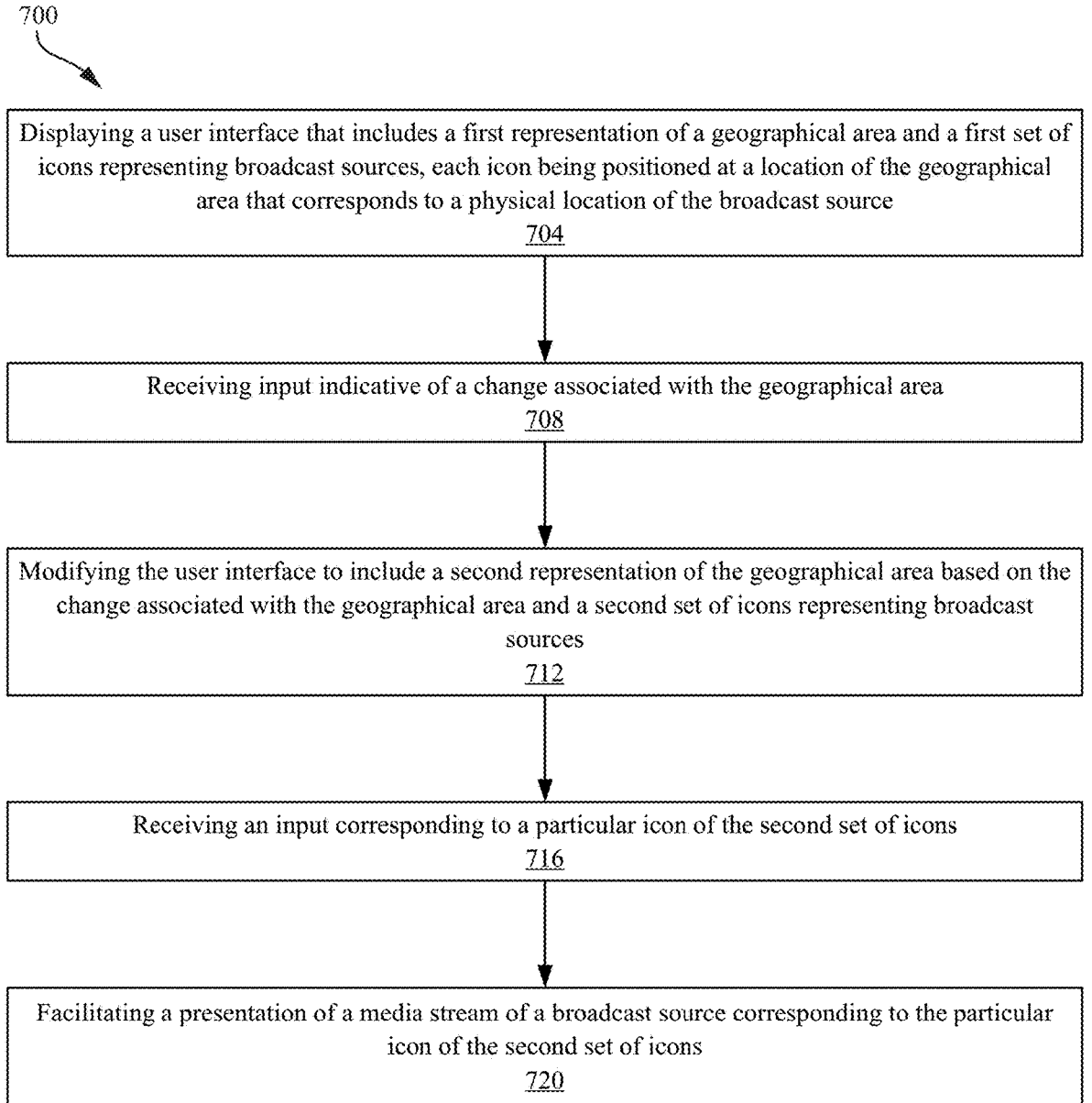

700

Displaying a user interface that includes a first representation of a geographical area and a first set of icons representing broadcast sources, each icon being positioned at a location of the geographical area that corresponds to a physical location of the broadcast source
704

Receiving input indicative of a change associated with the geographical area
708

Modifying the user interface to include a second representation of the geographical area based on the change associated with the geographical area and a second set of icons representing broadcast sources
712

Receiving an input corresponding to a particular icon of the second set of icons
716

Facilitating a presentation of a media stream of a broadcast source corresponding to the particular icon of the second set of icons
720

FIG. 7

METHODS AND SYSTEMS FOR GEOSPATIAL IDENTIFICATION OF MEDIA STREAMS

CROSS-REFERENCE TO RELATED APPLICATIONS

The present patent application claims the benefit of priority to U.S. Provisional Patent Application No. 63/280,425 filed Nov. 17, 2021, to U.S. Provisional Patent Application No. 63/296,717 filed Jan. 5, 2022, and to U.S. Provisional Patent Application No. 63/296,740 filed Jan. 5, 2022, all of which are incorporated herein by reference in their entirety for all purposes.

TECHNICAL FIELD

This disclosure relates generally to identifying media streams based on geospatial data, and more particularly to identification and routing of media streams according to geospatial data.

BACKGROUND

Broadcast sources operate at fixed geographical locations and broadcast media at particular radio frequencies. Due to the inherent limitations of radio-frequency-based communications, only receivers positioned within range (e.g., within a predetermined distance) of the broadcast source mat be capable of receiving media from the broadcast source. Receivers outside of that range may not receive the media due to the distance and/or interference from other broadcast sources. Thus, for a receiver to continue receiving media from the broadcast source, the receiver may have to remain physically located within range of the broadcast source.

When traveling, receivers may continually drop out of range of broadcast sources. A receiver may attempt to identify new broadcast sources as the receiver comes within range of the new broadcast sources. However, since broadcast sources may operate over a variety of radio frequencies, it may be difficult to identify a radio frequency over which a new broadcast source transmits. Furthermore, even if the radio frequency of a new broadcast source is idented, the media being broadcast may not correspond to the previous broadcast source or user preferences. It may be difficult to identify similar broadcast sources.

To increase their broadcast range and eliminate radio-frequency scanning to identify comparable sources, broadcast sources may broadcast media over alternative communications channels configured to be received over larger geographical areas. A broadcast source may transmit media over a secondary broadcast channel (e.g., such as the Internet, or the like), enabling any device configured to connect to the secondary broadcast channel the ability to receive media from that broadcast source. However, it may be difficult for receivers to identify new broadcast sources operating within particular fixed geographical locations.

SUMMARY

Methods are described herein for identifying broadcast sources within a MapView system. The methods can include displaying a first representation of a first portion of a geographical area, wherein the first representation includes icons representing locations of a first set of broadcast sources within the first portion of the geographical area; extracting user characteristics from a first user device associated with the first representation of the first portion geographical area, wherein the user characteristics include geospatial data indicative of a location of the first user device within the geographical area; executing a machine-learning model on the user characteristics, the machine-learning model being configured to generate a prediction of a contemporaneous broadcast characteristics associated with at least one user of the first user device; displaying a second representation of a second portion of a geographical area based on the contemporaneous broadcast characteristics, wherein the second representation includes icons representing locations of a second set of broadcast sources within the second portion of the geographical area; and facilitating a presentation of media from a particular broadcast source of the second set of broadcast sources.

The systems are described herein for identifying broadcast sources within a MapView system. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 6 is a flowchart of an example process for identifying media streams based on a real-time geolocation according to aspects of the present disclosure.

FIG. 7 is a flowchart of an example process for geospatial identification and presentation of media streams according to a real-time geolocation according to aspects of the present disclosure.

DETAILED DESCRIPTION

Figure 1:
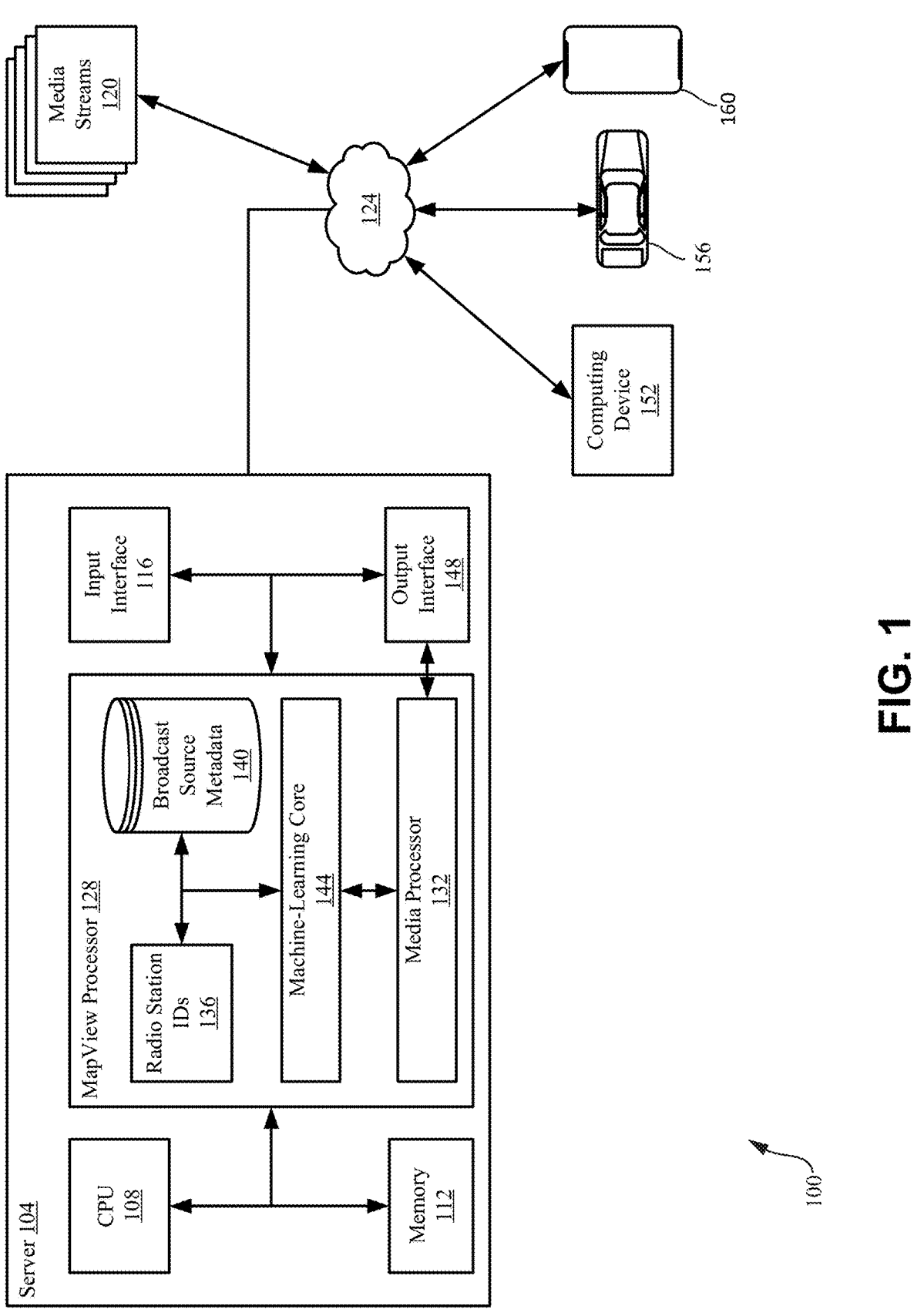
FIG. 1 is a block diagram of an example MapView system configured to identify and route media streams based on multi-layer geospatial data according to aspects of the present disclosure.

Methods and systems are provided herein for identifying and presenting media streams based on geospatial data. A MapView system may include one or more devices, systems, and/or software components that operate to provide geospatial data to users. In some examples, the MapView system may be executed by a computing device of a vehicle such as, but not limited to, an in-vehicle entertainment system or other computing device that provides operations of the vehicle. Alternatively, the MapView system may include one or more separate computing devices that operate within the vehicle (e.g., operating separately from, but potentially connected to, the in-vehicle entertainment system, etc.). In other examples, the MapView system may be executed by a mobile device, a stationary computing device (e.g., such as a desktop computer or the like), a thin client, a server, or any other processing device. The MapView system can be configured to receive sensor data and/or other data to present geospatial data to users of the MapView system.

The MapView system may present one or more interfaces (e.g., graphical user interfaces, etc.) configured to display geospatial data, other data of received or generated by the MapView system, receive data from one or more users or devices, present media streams (e.g., such as video and/or audio) from broadcast sources (e.g., such as, but not limited to radio stations, Internet radio, etc.). For example, the MapView system may be configured to display a representation of a geographical area (e.g., such as Earth, an extraterrestrial planet, a fictional locational, etc.). The representation may be a globe, map, or the like. The representation of the geographical area may include icons indicative of a broadcast source. The icons may include information associated with the broadcast source such as, but not limited to, a logo, a symbol, an identifier such as a name or other identifier, a description of media broadcast by the broadcast source, age of the broadcast source, etc.

Users may interact with the MapView system to modify the representation and/or geographical area. For example, users may interact with the MapView system to rotate the globe, zoom in, zoom out, select a new representation of the geographical area, select a different portion of the geographical area for display, select a new geographical area, and/or the like. The MapView system may receive input from an input/output device (e.g., keyboard, mouse, etc.), touchscreen, voice input (e.g., directly or by a digital assistant, etc.), hard keys (e.g., positioned on a steering wheel, another area of a vehicle, proximate to an interface of the MapView system, combinations thereof, and the like). For instance, input may be received to cause the representation of the geographical area to be focused over the eastern United States. Further input may be received to zoom in to New York City, at which point the representation may include a map of at least a portion of New York City.

The MapView system may generate one or more markers within the representation of the geographical area indicative of a current location of the MapView system within the graphical area. The MapView system may automatically update the current location using data received from one or more nearby computing devices or sensors. For example, if operating within an in-vehicle entertainment system, the MapView system may receive sensor data from sensors of other devices of the vehicle such as a global positioning system, speedometer, accelerometers, etc. In another example, the MapView system (operating in a vehicle or on another device) may receive sensor data from a mobile device in communication with the MapView system (e.g., via Bluetooth, Wi-Fi, etc.). Examples of data that may be received by the MapView system include, but is not limited to, a global positioning system location, speed, direction, acceleration, any other sensor data of a vehicle, any sensor data of a mobile device, and the like. Alternatively, or additionally, the MapView system may receive activity data indicative of a current activity of a user operating the MapView system to modify the representation of the geographical being displayed. Examples of activity data include, but is not limited to, stationary, walking, cycling, driving, flying, etc.

The representation of the geographical area may include one or more icons representing broadcast sources (e.g., radio stations, media broadcasting locations, etc.). The MapView system may use a location of the broadcast source to position the icon within the representation of the geographical area such that the icon is positioned at approximately a same location within the representation of the geographical area as the broadcast source is positioned within the geographical area. The MapView system may approximate the location of broadcast sources within non-Earth geographical locations. In some instances, the MapView may use a machine-learning model to determine locations for broadcast sources within non-Earth geographical areas. The MapView system may train the machine-learning model using images of portions of real-world geographical areas and an identification of a location of one or more broadcast sources within the portions of real-world. The MapView system may then pass an image or map of a hypothetical geographical area and the machine-learning model may predict the locations of broadcast sources within the hypothetical geographical area. The machine-learning model may generate locations for broadcast sources within extraterrestrial planets, fictional locations, or the like such that the broadcast sources are located at realistic locations. The machine-learning model may be, but is not limited to, neural network, perceptrons, decision trees, Naïve Base, a regression-based model (e.g., such as logistic, etc.), neural network, convolutional neural network, deep learning networks, support vector machines (SVM), Naïve Bayes, K-nearest neighbor, general adversarial networks, combinations thereof, or the like.

In some examples, a MapView system may include a database of identified broadcast sources. The database may include an identification of broadcast sources, an identification of one or more media streams broadcast by the broadcast source, an identification of a location of the media streams (e.g., global positioning system coordinates, latitude and longitude coordinates, address, etc.), an identification of a broadcast area over which a media stream broadcast from a broadcast source may be received via radio-frequency receiver, and/or the like.

A MapView system can identify particular media streams in diverse geolocations for presentation by a particular device. For example, the MapView system may identify broadcast sources through one or more communication channels (e.g., radio, Internet, etc.), and represent the broadcast sources as icons within the representation of the geographical area. The MapView system may filter the icons being displayed and/or the current portion of the geographical area being represented based on user input. For example, the MapView system may receive a set of constraints for use in identifying a set of media streams media streams and/or broadcast sources. Examples of constraints may include, but are not limited to, a genre, a song, an artist, an album, a media presentation (e.g., a concert, television show, movie, etc.), an identification of historical media streams (e.g., within a predetermined time interval such as past day, year, etc. or with any time interval), a broadcast source (e.g., radio station), a location (e.g., a country, a state, a region, a city, an address, etc., a context (e.g., such as a concept, emotion, an experience, and/or the like), or the like.

The MapView system may use the constraints to filter the current icons displayed within the representation of the geographical area and/or modify the representation of the geographical area. For example, the MapView system may display a first set of icons representing broadcast sources located within the geographical area in the representation of the geographical area. The first set of icons may include all broadcast sources in the geographical area or a portion of the broadcast sources based on properties of one or more users of the MapView system (e.g., based on broadcast sources historically selected by the one or more users, preferred genres of the one or more users, etc.). The MapView system may receive constraints that include an identification of a genre. The MapView system may generate a subset of the first set of icons that includes only those icons that represent broadcast sources broadcasting media streams tagged with the identified genre. In another example, the MapView system may receive constraints that includes an identification of a genre and a location. The MapView system may then modify the representation of the geographical area such that the representation is centered over the portion of the geographical area that includes the identified location. The MapView system may then display icons within the representation of the portion of the geographical area that correspond to broadcast sources broadcasting media streams tagged with the identified genre.

In some instances, the MapView system may execute one or more machine-learning models configured to predict one or more media streams that should be included in the set of media streams. The machine-learning models may be trained using training data received and/or derived from media streaming data associated with the current user such as, but not limited to, media streams previously presented by the MapView system. Alternatively, or additionally, training data may also be received and/or derived from historical data associated with the MapView system, information from devices associated with the current user (e.g., such as, but not limited to, information received and/or derived from other devices operated by the current user, devices operated by users associated with the current user (e.g., friends, family, social media contacts, device contacts, devices that previously presented media streams that satisfy one or more of the constraints, etc.), combinations thereof, or the like. Alternatively, or additionally, the machine-learning models may be trained using media streaming data associated other devices (e.g., such as devices similar to the MapView system, devices executing a MapView system or MapView application, devices executing a media streaming application, devices operated by users that are similar to the current user as determined by media stream history or location, etc.). The machine-learning models may be trained using supervised training, supervised training, semi-supervised training, reinforcement training, combinations thereof, or the like.

The machine-learning models may include any model configured to generate predictions based on historical data such as, but not limited to a classifier. Examples of such machine-learning models include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

Once trained, the machine-learning models may be executed to generate the first set of icons such that only those broadcast sources predicted to be of interest to a current user of the MapView system may be presented. The machine-learning models may receive, as input, information associated with the current user (e.g., an identification of the current user, demographic information, a historical set of media streams or broadcast sources associated with the current user, etc.), a current location of the MapView system, an intended location of the MapView system, an identification of a geographical area combinations, thereof, or the like. Alternatively, or additionally, the machine-learning models may be executed using the constraints to predict the subset of the first set of icons.

In an illustrative example, a first user device may include a MapView system. The first user device may be, but is not limited to, a mobile device (e.g., such as a smartphone, laptop, etc.), an in-vehicle entertainment system, a stationary computing device (e.g., such as desktop computer, server, etc.), or the like. The MapView system may adjust operations of the MapView system based on one or more current users. The MapView system may store characteristics of a user during use of the MapView system. Examples of such characteristics include, but are not limited to, an identification of searches for media streams and/or broadcast sources (along with the results of the search), filters applied to media streams and/or broadcast sources, an identifications of media streams selected by the user or presented by the MapView system to the user, an identification of a location of the user when the media streams were selected or presented by the MapView system, demographic information of the user, historical locations of the user (e.g., used to identify routines such as commutes or frequently traveled routes, etc.), driving characteristics (e.g., breaking events, speeding, etc.), an identification of associated users (e.g., family members, users frequently traveling with the current user, etc.), characteristics of the associated users, combinations thereof, or the like. The MapView system may receive characteristics of the user from the user (e.g., via an input interface, a device in communication with the MapView system or the first user device, and/or the like).

Alternatively, or additionally, the MapView system may generate characteristics of the user when the user operates the first user device and/or the MapView system. For example, a first user may be unknown to the MapView system. The first user may interact with the MapView system to facilitate a presentation of a first media stream from a first broadcast source to the first user. The MapView system may store an identification of the first media stream, an identification of the first broadcast source, an identification of how the first user selected the first broadcast stream (e.g., via a text search, selection of an icon on a map, a filter, a recommendation from another user, from an identification of what media streams nearby users are being presented from other MapView systems, etc.), a location of the user over the time in which the first media stream is being presented, an identification of the device on which the MapView system is operating, etc. The MapView system may capture any information associated with the presentation of the media stream and/or the user's interaction with the MapView system. The information may be used to generate a user profile of the first user and/or supplement information receive directly from the first user.

The MapView may initially attempt to identify the user accessing the MapView system. In some instances, the MapView system may request that the user login in to the MapView system using access credentials (e.g., using a username and/or password). The MapView system may then access the user profile associated with the access credentials. In other instances, the MapView system may use other information to infer the identity of the current user. For example, if the MapView system may determine an identity of a user based on a key fob used to access a vehicle within which the MapView system is operating. Initially, the user may associate the key fob with a user profile (e.g., using a user identifier and/or access credentials as previously described). The MapView system may store signal information associated with the key fob (e.g., frequency, channel, modulation, signal strength, etc.) and/or an identifier associated with the key fob. When the user uses the key fob to unlock or otherwise access the vehicle, the MapView system may also receive the signal. The MapView system may then identify the key fob based on the signal information and identify the user based on identifying the key fob. Alternatively, the MapView system may receive an identification the key fob used to access the vehicle from a component of the vehicle. The MapView system may then identify the user from the identification of the key fob.

In another example, the MapView system may identify the current user from a device in communication with the MapView system. For instance, the MapView system and/or the in-vehicle entertainment system may be connected to a mobile device (e.g., via Bluetooth, Wi-Fi, or the like). The mobile device may be executing a MapView application or companion application to the MapView system that has already identified the current user. The MapView application or companion application may transmit an identification of the user and/or the user profile to the MapView system. The MapView system may then access the user profile associated with the identified user. Alternatively, the user may be identified without the mobile device executing a MapView application or companion application. The MapView system may store an association of the current user with an identifier of the mobile device. Examples of identifiers of the mobile device that may be used include, but are not limited to, an Internet Protocol address, a Media Access Control Address, a mobile ad identifier (MAID) of the mobile device, a model identifier, a software version operating on the mobile device, a model number, a serial number, a carrier used by the mobile device, combinations thereof, or the like. When the mobile device connects to the MapView system or in-vehicle entertainment system, the MapView system may identify the mobile device then identify the user based on the identification of the mobile device. The MapView system may then access the user profile associated with the identified user.

The MapView system may use other characteristics and/ or methods in addition to or in place of those previously described to identify the current user. For example, the MapView system may use sensor data to identify the current user. The MapView may receive sensor data from sensors of the vehicle (e.g., when the MapView system is operating within the vehicle) or internal sensors (e.g., of the MapView system, a mobile device, or the like). The MapView system may define a pattern that corresponds to the user using the sensor data. In some instances, the MapView system may use a machine-learning model to process the sensor data and predict an identity of the user that corresponds to the sensor data. The machine-learning model may be trained using historical sensor data corresponding to the user (using supervised or unsupervised learning). The machine-learning model may then generate a set of predictions and a set of corresponding probabilities that indicate the confidence that each prediction of the set of predictions is accurate. The MapView system may then determine that the current user is the predicted user with a highest corresponding probability. Examples of sensor data usable by the MapView system to define a pattern of a user include, but are not limited to, locations of the user, routes traveled by the user, average speed, breaking events (e.g., as determined by one or more accelerometers and/or speedometers, etc.), frequently traveled routes, frequently traveled locations, frequently access media streams or broadcast sources, frequently used devices (e.g., those used to access the MapView system, those used to communication with the MapView system, and/or other devices), combinations thereof, or the like. The machine-learning model use discriminant analysis (linear, quadratic, logarithmic, etc.), K-nearest neighbor or K-means clustering, Naïve Bayes, neural networks (recurrent neural networks, deep learning networks, etc.), support vector machines, Bayesian networks, principal component analysis, combinations thereof, or the like.

The MapView system may display a first representation of a first portion of a geographical area. The first representation of the first portion of the geographical area may be based on whether the MapView system identified the user and/or one or more characteristics of the MapView system. For example, the MapView system may select the first representation based on user preferences, a previous selection of a representation during a previous use of the MapView system by the user, or the like. Similarly, the MapView system may select the first portion and/or the first geographical area based on user preferences, a previous selection of a geographical area and/or a portion there of during a previous use of the MapView system by the user, a location of the user, combinations thereof, or the like. If the MapView system does not identify the user, the MapView system may randomly select the representation, the first portion of the first geographical area, and/or the first geographical area (e.g., using a random number generator and thresholds). Alternatively, the MapView system may select a default representation, first portion of the first geographical area, and/or first geographical area (e.g., such as one based on the current location of the MapView system, or on any other criteria, etc.).

For example, the first geographical area may include the Earth, and the first representation may include a globe view centered on North America (e.g., the first portion of the Earth). The geographical area may include the Earth or any region thereof, an extraterrestrial location (e.g., Mars, Titan etc.), a fictional location (e.g., from literature, a movie, etc.), or the like. The first representation may include icons representing locations of a first set of broadcast sources within the first portion of the geographical area. In some instances, the first representation may include other icons, objects, identifiers, etc. representing other locations within the first portion of the first geographical area (e.g., an identification of street names, locations associated with media streams or particular media, an identification of notable locations such as historic locations or locations frequently visited by users, an identification of landmarks, an identification of other types of broadcast sources (e.g., non-radio information sources, or the like), etc.

The MapView system may extract user characteristics from information associated with the current user. The information associated with the current user may be obtained from one or more sources. If the current user associated with a user profile (as previously described), then the user information associated with the current user may be received from the user profile. Alternatively, or additional the information associated with the current user may be received from the first user device, sensors associated with the first user device, devices connected to or in communication with the first user device, one or more servers, and/or the like. The extracted user characteristics can include, but are not limited to, information from the user profile (e.g., corresponding to a MapView user profile as previously described or a user profile associated with a computing device operating or connect to the MapView system such as the in-view entertainment system, etc.), a present location of the current user (e.g., based on a current location of the MapView system, or the like), activity data associated with the first user device (e.g., an movement properties such as acceleration, speed direction, and/or the like), historical media streams presented by the current user and/or the MapView system in association with the current user, combinations thereof, or the like.

The MapView system may then execute a machine-learning model (the same as or different from the machine-learning model previously described) using the user characteristics. The machine-learning model may be configured to generate a prediction of contemporaneous broadcast characteristics of at least one user of the first user device. The contemporaneous broadcast characteristics may correspond to a likelihood of media streams and/or broadcast sources that are of interest to the current user at a particular time instant. For example, users may select a variety of media streams or broadcast sources for presentation. Users may be more likely to select certain media streams during certain time intervals than others. For example, on the way home from work or school, users may be more likely to select certain media streams (e.g., those that reduce stress, that are informative such as the news, etc.). During a workout, those same users may be more likely to select different media streams such those that are higher energy. The user characteristics may be used by a trained machine-learning model to predict what the current user would likely select based on the current user's current circumstances.

The machine-learning model may be trained using training data received or derived from the user profile of the current user, historically selected media streams and/or broadcast sources, and/or contextual information associated with each historically selected media stream and/or broadcasts source (e.g., the current user's location, driving characteristics such as current or changes in acceleration or current or changes in speed, route information from a navigation system, activity data, current traffic, time of day, day of the week and/or year, weather information, social media information, etc.). In some instances, the training data can also include information associated with the current user (e.g., such as, but not limited to, demographic information, contact information, social media information, preferences of the current user, an identification of media applications used by the current user, an identification of media streams selected by the current user from the other media application, an identification of media stored by a device of the current user, combinations thereof, or the like), information associated with users connected to the current user (e.g., such as, but not limited to, friends, family, social media contacts, followed users, etc., wherein the information can include any of the information sources as previously described in connection to the current user), information associated with similar users to the current users (e.g., identified based on user characteristics, a location of the current user, a user profile of the current user, an identification of recently selected media streams and/or broadcast streams, combinations thereof, or the like, and wherein the information can include any of the information sources as previously described in connection to the current user), combinations thereof, or the like.

Sets of features may be extracted from the training data. A feature may correspond to any discrete measurable property or characteristic. Each set of features may include features representing data received and/or derived over a time interval. The set of features may then be processed into a feature vector to incorporate the time dimension into a machine-learning model input. Each feature vector may be processed by the machine-learning model to train the model to generate predictions that correspond to particular temporal circumstances. If trained via supervised learning, each feature vector may be associated with a label indicative of one or more media streams and/or broadcast sources should be output from the machine-learning model given the particular input feature vector. During training the machine-learning model may adjust internal weights that cause certain predictions to be output given particular feature vector. The larger the training data the more accurate the machine-learning model may be.

The machine-learning model can be trained using supervised or unsupervised learning. In some instances, after the machine-learning model is trained and in use, the machine-learning model may be trained using reinforcement learning. In those instances, the machine-learning model may predict a particular media stream or broadcast source that the user is likely to find of interest. If the current user selects the media stream and/or broadcast source or (if automatic presentation is enabled) allows the media stream and/or broadcast source to continue presenting, then the machine-learning model may consider the prediction to be accurate and adjust internal weights accordingly such that that prediction is more likely to be output from a similar input. If the current user does not select the media stream and/or broadcast source or turns to another media stream and/or broadcast source (or turns off the MapView system), then the machine-learning model may consider the prediction to be incorrect and adjust internal weights accordingly such that that prediction is less likely to be output from a similar input.

Examples of machine-learning models that may be trained to generate the predictions as described include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

The MapView system may store the machine-learning model locally or remotely (in a remotely accessible database, server, etc.). Since the machine-learning model is trained using data associated with a particular user, the MapView system may store multiple machine-learning models (locally or remotely) for each user configured to use the MapView system. If stored locally, each machine-learning model may be trained and executed locally (e.g., as a component of the MapView system). If stored remotely, the MapView system may generate a feature vector corresponding to contemporaneously received and/or derived user characteristics (e.g., generated in real-time) and transmit the set of features to a remote computing device that includes the machine-learning model. The remote computing device may execute the machine-learning model using the feature vector and transmit the result from the machine-learning model back to the MapView system.

The MapView system can display a second representation of a second portion of a geographical area based on the contemporaneous broadcast characteristics. The MapView system may process the contemporaneous broadcast characteristics to determine how to modify the currently displayed representation of the first portion of the first geographical area to one that may be more of interest to the current user at the current time instant. The second geographical area may be a same or different geographical area from the first geographical area. The second portion of the second geographical area may be a same or different portion from the first portion of the first geographical area. The second representation may be a same or different representation from the first representation. In some instances, the second representation of a second portion of a geographical area may icons representing locations of a second set of broadcast sources within the second portion of the geographical area. The second set of broadcast sources may include broadcast sources selected by the MapView system based on the contemporaneous broadcast characteristics or included in the contemporaneous broadcast characteristics that are more likely to be of interest to current user. Alternatively, or additionally, the second set of broadcast sources may include broadcast sources resulting from an execution of a query and/or application of a filter by the current user. For example, the current user may search (via text, hard keys, touchscreen, remote communication from another device, and/or voice) for a particular type of broadcast source, request broadcast sources from a particular location be displayed, filter the first set of broadcast sources based on a constraint, etc. to define the second set of broadcast sources. Alternatively, the MapView system may determine which broadcast sources to display to the current user within the second representation based on the contemporaneous broadcast characteristics and/or other criteria. The second set of broadcast sources may have some broadcast sources that overlap with the first set of broadcast sources (e.g., if the second portion of the second geographical area overlaps with the first portion of the first geographical area, etc.).

The MapView system may then facilitate a presentation of media from a particular broadcast source of the second set of broadcast sources based on the contemporaneous broadcast characteristics. The MapView system may use the machine-learning model to predict a particular media stream that will be of interest to the current user. The MapView system may cause the particular media stream to automatically be presented to the current user (e.g., through the first user device, through devices connected to the first user device such as displays and/or speakers, etc.). Alternatively, the MapView system may present the particular media stream to the current user for selection. Upon being selected by the current user, the MapView system may cause the particular media stream to be presented.

In some instances, other devices may cause the MapView system to facilitate a presentation of an alternative media stream. For example, another device proximate to the MapView system or connected to the MapView system through another system (e.g., such as the in-vehicle entertainment system) may transmit a request to the MapView system to present a different media stream. The different media stream may be different media stream in the second set of broadcast sources or a new media stream of a new broadcast source. The current user may receive a notification from the other device identifying the requested media stream, information associated with the requested media stream, information associated with the corresponding broadcast source of the requested media stream, an identification of the device that transmitted the request, an identification of a user operating the device that transmitted the request, combinations thereof or the like. The current user may receive the notification at any time (e.g., during any of the aforementioned operations of the MapView system, etc.). Upon approval of the new media stream, the MapView system may facilitate presentation of the new media stream.

For example, a vehicle may include an in-view entertainment system that includes a primary display positioned between the front driver seat and front passenger seat. The vehicle may have one or more secondary displays in addition to the primary display. The secondary displays may be positioned in front of the front passenger seat, in front of any of the rear passenger seats, etc. The secondary displays may be operated by the MapView system and/or the in-vehicle entertainment system. Each secondary display may present an extended (e.g., a same or similar) view of what is being displayed by the primary display. When a user interacts with the primary display (e.g., altering the representation of the portion of the geographical area, etc.), each secondary display may mirror the changes made at the primary display. Each secondary display may be independently operable to display different representations of the different portions of different geographical areas. For example, each display may include an input/output interface, include touchscreen capabilities, voice control capabilities, etc. allowing a user to manipulate an instance of the MapView system. Changes made by a secondary display can cause a corresponding change to be displayed by the primary display. The secondary display may provide similar or the same functionality as the MapView system of the primary display. For example, users can search for media streams and/or broadcast sources through icons within the representation of the geographical area being displayed, filter media streams and/or broadcast sources, search through text or other constraints (e.g., genre, location, etc.), etc.

A user operating a secondary display may identify a media stream that the user would like to present. The user may select the media stream causing a notification to appear in the primary display identifying the requested media stream as previously described. The driver (e.g., the current user) may then select the requested media stream for presentation, ignore the notification, or deny the request. Alternatively, or additionally, the notification may appear in a heads-up display of the driver, on the steering wheel of the driver, through a voice communication, and/or the like.

The MapView system may use a multi-layer security to secure each MapView system from unauthorized access by authorized secondary display, external devices, etc. Secondary display may request access to a primary MapView system using access credentials, public/private keys, an access token, and/or the like. Access credentials may be defined by a user of the MapView system. Access tokens and/or public/private keys may be stored in internal memory of the MapView system. When a secondary display requests access to the primary MapView system, the device may transmit its access token to authenticate the device as a legitimate and authorized instance of the MapView system. The primary MapView system may compare the received access token to an internal token table. If a matching entry is identified, then the secondary display may be considered as authentic. Public/private keys may be used to encrypt transmissions to and from the primary MapView system and/or instances of the MapView system.

Once a secondary display is granted access to a primary MapView system, the primary MapView system may begin share data with the device. The shared data may include, but is not limited to, a location of the primary MapView system, information associated with media being presented by the primary MapView system (e.g., title, album, artist, release date, liner notes, interesting facts, etc.), information associated with a current broadcast source to which the primary MapView system is connected, information associated with a historical broadcast source to which the primary MapView system has been connected, an identification of the devices connected to the primary MapView system, a location of the devices connect to the primary MapView system, communications transmitted during the current defined session, an identification of media queued for presentation through the primary MapView system, the representation of the geographical area presented by the primary MapView system, the representation of the geographical area presented by a secondary display or another primary MapView system, combinations thereof, or the like.

In some examples, the MapView system may manage communications between devices connected to the primary MapView system. For instance, a first secondary display may communicate with a second secondary display within a vehicle. The primary MapView system may receive communications from the first primary display and forward the communications to the second secondary display. In some instances, the MapView system may encrypt communications that are to be transmitted through indirect communications to protect the integrity of the primary MapView system and the other devices connected to the primary MapView system. In those instances, communications transmitted over direct communications may not be encrypted as the source and/or destination of the communications are more likely to be known to devices communicating over direct communications. Alternatively, the primary MapView system may encrypt all communications being transmitted through the primary MapView system.

Access to the primary MapView system be granted indefinitely or for a predetermined period (e.g., such as a defined sessions based on the duration of a road trip, time, distance, etc.). The primary MapView system may determine when a defined session is to be terminated (e.g., via determining that the primary MapView system is located at a navigation destination, time, distance, combinations thereof, or the like). When the defined session terminates, the primary MapView system may terminate the connections with any device that does not have indefinite access rights.

FIG. 1 is a block diagram of an example system 100 configured to implement a MapView system that can identify and route media streams based on multi-layer geospatial data according to aspects of the present disclosure. System 100 may include hardware and/or software components that operate within a distributed environment to provide a MapView system. The MapView system may include hardware and/or software components that may be included within a client-side device (e.g., within a computing device or user device configured to receive MapView-system services, media streams, etc. such as, but not limited to computing device 152, an in-vehicle entertainment system 156 of a vehicle, a mobile device 160, or the like), a server-side device (e.g., such as server 104), or distributed between one or more user devices and server 104. When operating in a distributed environment (e.g., distributed between one or more user devices and server 104), the MapView system may include executable processes which may be executed by the user device and some processes may be executed by the server.

Server 104 may receive media streams 120 (e.g., such, but not limited to radio broadcasts) over network 124 (e.g., a cloud network, a local area network, a wide area network, the Internet, etc.) and/or via a radio frequency receiver. The media streams 120 may be transmitted by a broadcast source (e.g., physical location from which a media stream is broadcasted or transmitted such as, but not limited to, a radio station).

Server 104 may include memory 112 which may store executable instructions of the MapView system as well as executable instructions that provide other services of the server. The executable instructions may be received by CPU 108 from memory 112 over a bus or other input/output interface. Server 104 may include input interface 116 configured to receive input from a variety of disparate sources (e.g., mobile devices, computing devices, vehicles, broadcast sources, etc.) and an output interface 148 configured to transmit communications in a format native to the recipient device. MapView processor 128 may include hardware components (e.g., processor 132, memory, other processors (not shown), etc.) and/or software processes that execute to provide the functionality of MapView processor 128. MapView Processor 128 may include one or more databases that include an identification of broadcast sources 136, broadcast source metadata 140 (e.g., identification of media streams broadcast by a broadcast source, a genre of the media streams, a program schedule of content included in the media streams, location of the broadcast source, etc.), and/or the like.

Machine-learning core 144 may include one or more machine-learning models trained to provide services to user devices (e.g., devices 152-160). The machine-learning models include models configured to predict broadcast sources or broadcast streams that may be of interest to a user or user device. Examples of such machine-learning models include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

The machine-learning models may be trained using an identification of broadcast sources 136, broadcast source metadata 140, historical broadcast sources and/or media streams presented by a particular device or group of devices, demographic information associated with the particular device or group of devices, location information (e.g., of particular device, the group of devices, the broadcast sources, etc.), combinations thereof, or the like. When using a group of devices, MapView processor 128 may identify devices to be included in a group based on one or more common properties (e.g., connected via social media, recently transmitted or received text messages with another device of the group, demographic attributes, etc.). The training data may be stored in memory of MapView processor 128, one or more external servers or databases, user devices, and/or the like. When a machine-learning model is to be trained, MapView processor 128 may request data stored in any remote device using input interface 116 and output interface 148. The request may manual or automatic (e.g., generated and executed using one or more application programming interfaces, etc.). The machine-learning models may be trained using supervised training, supervised training, semi-supervised training, reinforcement training, combinations thereof, or the like.

Once trained, the machine-learning models may be executed (e.g., by media processor 132, CPU 108, by a user device, another device, etc.) to generate predictions for a particular device and/or user. For instance, a user device such as computing device 152 may access services provided a MapView system. The user device may interact with the MapView system through a user interface to identify broadcast sources and media streams. The user interface may include a representation of an environment (e.g., a map, globe, city, etc.) with icons positioned at the representation of the physical location of one or more broadcast sources.

For example, a map of San Francisco may be presented with an icon at 2601 Mariposa St. representing a location of a radio station. Computing device 152 may input constraints that cause machine-learning core 144 to predict broadcast sources or media streams that are to be of interest to a user of the user device. Computing device 152 may receive an identification of the broadcast sources or media streams and select a broadcast source to initiate a presentation of a media stream broadcast from the broadcast source. Alternatively, user input may be received selecting an icon within the representation of the environment and a media stream associated with the broadcast source represented by the icon may be presented. Machine-learning core 144 may provide other services such as identifying media streams to be presented by a user device in real-time based on a geographical location of the user device and/or broadcast source of the media stream, generating virtual media streaming virtual tours or sequences of broadcast sources (or media streams) that are to be presented by a user device, and/or the like.

Figure 2B:
FIG. 2A-2F are example user interfaces illustrating various aspects of a MapView system according to aspects of the present disclosure.
Figure 2A:
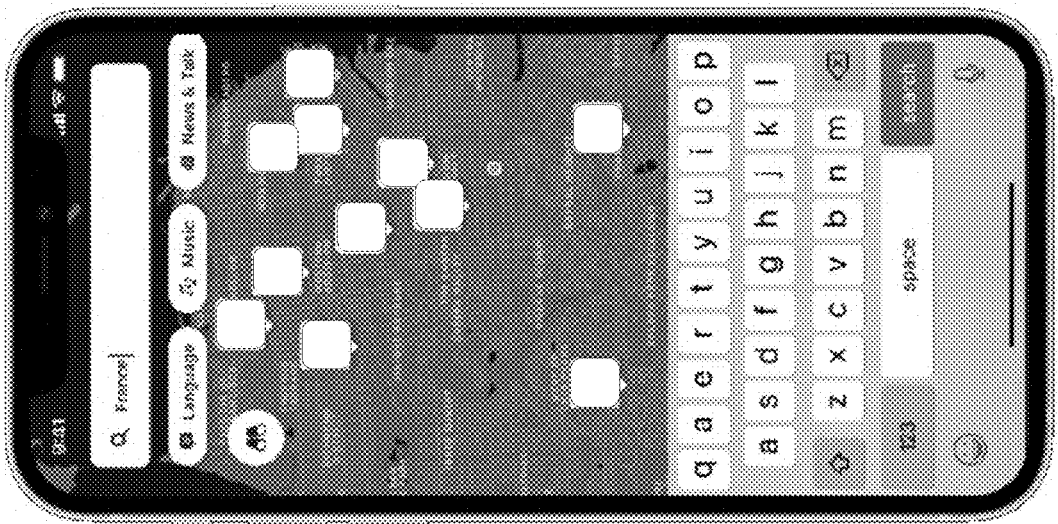

FIG. 2A-2F are example user interfaces illustrating various aspects of a MapView system according to aspects of the present disclosure. FIG. 2A illustrates an example MapView user interface in which a map of San Francisco is presented with icons representing broadcast sources. The icons are positioned over a representation of the physical location of the broadcast source represented by an icon. The user interface may be manipulated (using a touchscreen or other input device) to display a different portion of the map, zoom in, zoom out, etc. The user interface includes a search function (e.g., via a search bar), which may cause the user interface to display new maps. Examples of search criteria include, locations (e.g., such as "France" as shown), an identification of a broadcast source (e.g., such as KQED in San Francisco, etc.), an identification of a broadcast source, a genre, a program (e.g., such as a particular content segment of a media stream, a context or concept (e.g., such as science fiction, etc.), an emotion (e.g., such as calm music, etc.), combinations thereof, or the like. The search bar may accept Boolean operators and/or natural language input. The user interface may include filter icons that enabling filtering the quantity or type of icons on the user interface. The user interface may enable content-based filters (e.g., genre, broadcast source type, average listeners of a broadcast source, location of a broadcast source, language utilized by a broadcast source, program schedule, emotion, context or concept, content types, combinations thereof, or the like. For instance, the filters may be used to filter out radio stations that do not include local new content. Once a filter is activated, only those icons representing broadcast sources that satisfy the filter criteria may be presented with the user interface.

FIG. 2B illustrates another example MapView user interface. MapView user interfaces may present a representation of any location on Earth, any extraterrestrial location (e.g., Mars, Titan, etc.), any fictional locations (e.g., cities, planets, locations from movies, locations from books etc.), and/or the like. As shown, the user interface includes icons for broadcast sources that are physically located within Africa, South America, the Caribbean, the United States, Europe, and Scandinavia. The user interface can be manipulated (e.g., by touch, by text, by an input/output device such as a mouse or keyboard, by voice commands, by hard keys, etc.) to zoom into a particular location (e.g., as shown in FIG. 2A). Selecting an icon may provide additional information about the broadcast source including, but not limited to, an identification of the broadcast source, a location of the broadcast source, a language of the broadcast source, an approximate distance of the broadcast source from the user device display the user interface, a description of the one or more media streams broadcast from the broadcast source, similar broadcast sources (e.g., near this broadcast source or anywhere else), combinations thereof, or the like. Selecting the icon may also enable presentation additional user interface controls such as an icon to initiate presentation of the media stream of the broadcast source, an icon to request or display additional information, etc. The additional information may include a history of the broadcast source, a history of properties of the broadcast source within the location (e.g., a history of Bossa Nova music in Brazil), an identification of other user devices presenting this broadcast source (e.g., such as those associated with this user device, devices that have similar demographic properties, etc.), and/or the like.

The user interface may include a hidden gems icon that may provide suggested media streams or broadcast sources to the user device. In some instances, one or more machine-learning models may execute to provide the suggest media streams or broadcast sources. The machine-learning models (e.g., trained and/or utilized as previously described or described below) may be trained for a particular device (e.g., such as this user device), for groups of devices, or may be usable for any device.

Figure 2D:
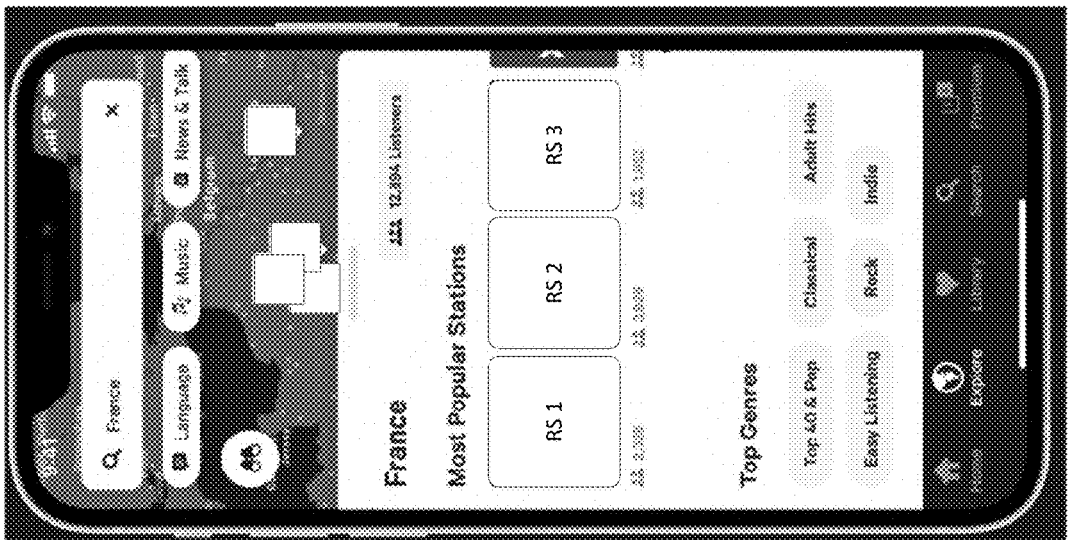
Figure 2C:
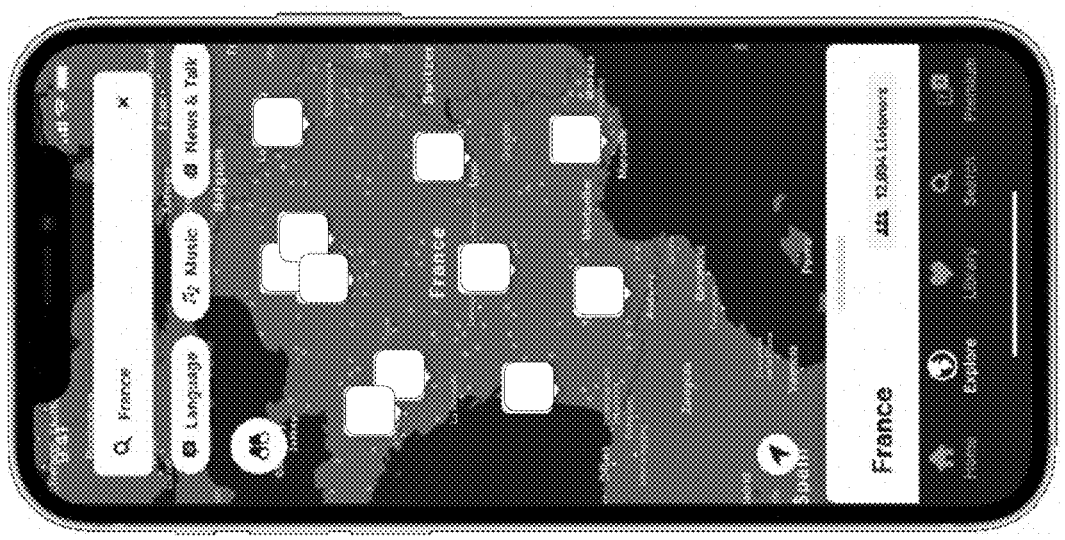

FIG. 2C illustrates an example MapView user interface of the country of France in response to a search query of "France". The user interface can include icons representing broadcast sources physically located within France. In some instances, large icons may represent broadcast sources that correspond to search or filter criteria. Broadcast sources that do not satisfy search or filter criteria may be represented differently (e.g., with a dot or other visual artifact positioned at a representation of the physical location of the broadcast source.

FIG. 2D illustrates an example MapView user interface when selecting a particular location (e.g., such as a continent, country, city, region, etc.). The MapView user interface includes additional interface upon selecting the particular location such as the most popular broadcast sources, top genres, quantity of users of MapView, etc.

Figure 2F:
Figure 2E:
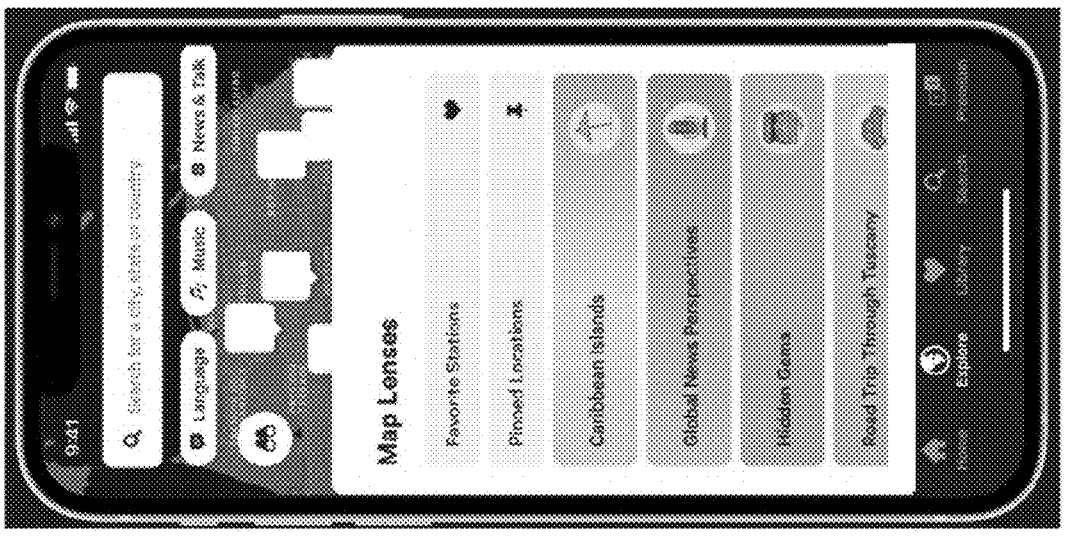

FIG. 2E illustrates an example MapView user interface utilizing Map Lenses that enable identification of new (to the user device) broadcast sources. The Map Lenses may be a component of a user interface that when activated provides an identification of broadcast sources marked as favorite, broadcast sources pinned for future listening, and controls for identifying new broadcast sources, based on genre, locality, etc. In some instances, Map Lenses may include icons that when selected establish particular experiences such as virtual tours (e.g., through Tuscany as shown, other real or fictional places, etc.).

For example, FIG. 2F illustrates an example MapView user interface presented upon selecting a virtual tour through the Caribbean Islands. The MapView system may define a virtual tour (as shown with the dotted line) and generates a sequence of broadcast sources that are physical located along the virtual route that could be presented by the user device if the user device was traveling along the route. Since the user device is also able to present the sequence of broadcast streams over a secondary broadcast channel (e.g., the Internet), the MapView system can simulate a route through the Caribbean Islands. The user device may progress through the route in real time (e.g., based on the distance of the route) broadcasting broadcast sources if the user device is positioned at a position along the virtual route that is within range of the broadcast source. The user device may switch to a next broadcast source when the user device is simulated as being at position of the virtual route within range of the next broadcast source. The user device may move along the route by moving an equivalent (or a proportion thereof) distance (not simulated) such as by driving a car on a road trip. Alternatively, the user device may switch to a next broadcast source upon one or more other conditions being satisfied such as a time interval or the like.

Figure 3B:
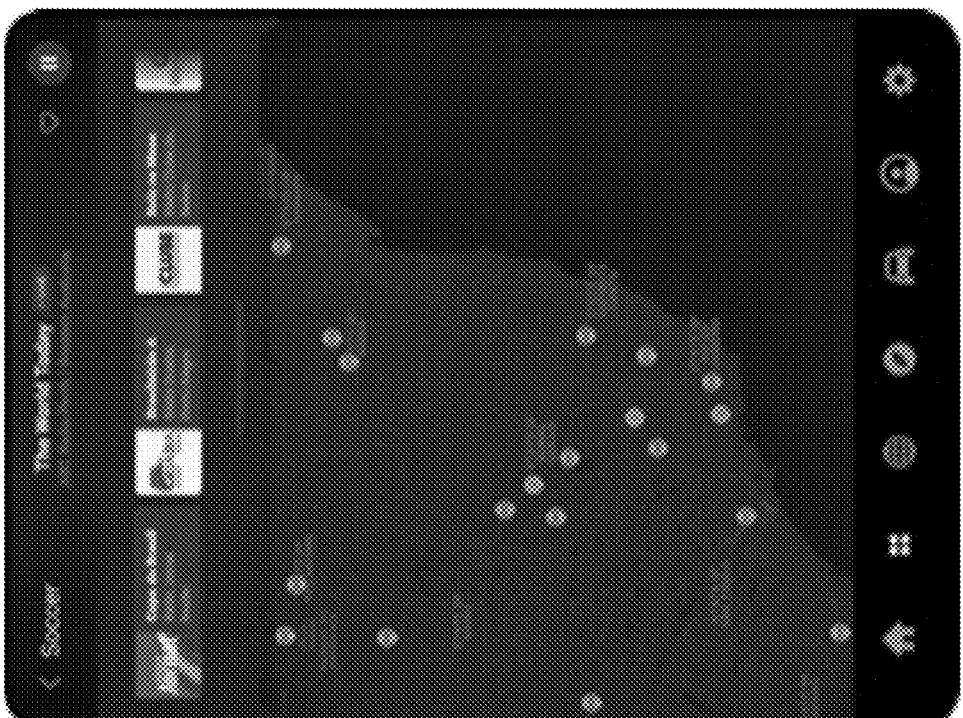
FIG. 3A-3B are example, alternative user interfaces illustrating various aspects of a MapView system according to aspects of the present disclosure.
Figure 3A:
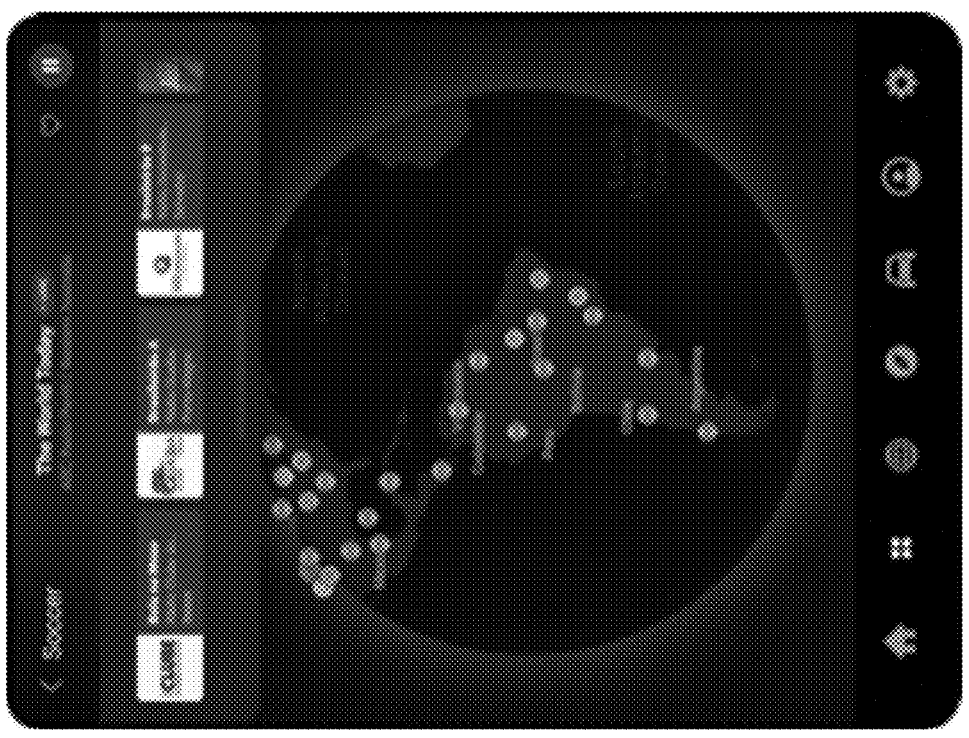

FIG. 3A-3B are example, alternative user interfaces illustrating various aspects of a MapView system according to aspects of the present disclosure. FIGS. 3A and 3B illustrate example MapView user interfaces that may be presented by a computing device or in-vehicle entertainment system. For instance, a user within a vehicle (e.g., as an operator or passenger) may access the MapView system to visually navigate a representation of the globe that includes icons representing broadcast sources (e.g., positioned at a representation of the physical location of the broadcast source. The user interface may include a search function to locate particular broadcast sources or types of broadcast sources (or media streams), filters to define what icons are displayed within the user interface, and/or the like. The user interface may include other icons for accessing other processes of the MapView system (e.g., such as those that utilize machine-learning models to predict broadcast sources, manage settings of the MapView system, identify new broadcast sources based on one or more criteria, or the like). The MapView user interface may be manipulated (using a touch screen interface or other input device) to move alter the environment that is presented, zoom in, zoom out, select a new environment to present, etc.

Figure 4:
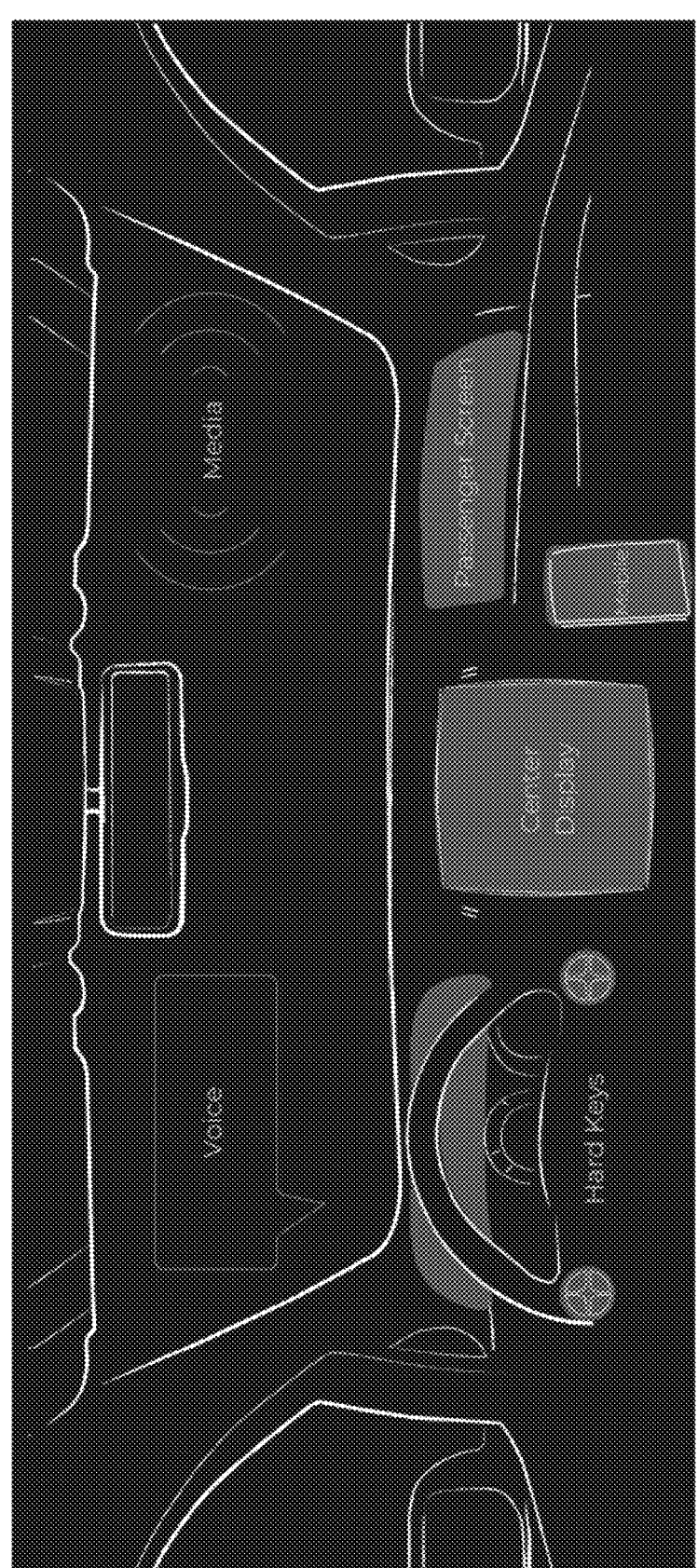
FIG. 4 is example illustration of a MapView system operating within a vehicle according to aspects of the present disclosure.

FIG. 4 is another example illustration of a MapView system operating within a vehicle according to aspects of the present disclosure. The MapView system may operate as a component of an in-vehicle entertainment system or as a separate device in communication with the in-vehicle entertainment system. The in-vehicle entertainment system may operate the displays within the vehicle (e.g., center display, passenger screen, etc.). The in-vehicle entertainment can provide services to the users of the vehicle (e.g., driver and/or one or more passengers) such as, but limited to, navigation (e.g., displaying a current global position system location, route selection and/or guidance, traffic, weather, etc.), presentation of media (e.g., playback of audio and/or visual media, etc.), climate control, etc. The MapView system may utilize the center display and/or passenger screen to display representations of geographical areas usable to search and/or identify broadcast sources and/or media streams.

The driver may interact with the center display via the center display itself (e.g., a touchscreen) or through physical controls surrounding the center display. The driver may also interact with the MapView system using alternative controls to avoid unsafe operation of the vehicle interacting with the MapView system. For example, the driver may interact with the MapView system using voice controls or hard keys mounted on the steering wheel. The voice controls and hard keys allow the driver to interact with the MapView system while maintaining focus and eye contact with the road ahead of the vehicle.

The passenger may interact with the MapView system center display, passenger screen, and/or a mobile screen (e.g., executing a MapView application). The passenger screen may be a touchscreen display configured to receive input via touch. The passenger screen may also include physical controls positioned proximate to the passenger screen. The passenger the MapView system using a MapView application on a mobile device. The MapView application may communicate with the MapView system executing with the vehicle (e.g., via Bluetooth, Wi-Fi, cellular, etc.). Alternatively, or additionally, the MapView application may communicate with a server (e.g., such as server 104 of FIG. 1), which may relay communicates to the MapView system within the mobile device. The passenger may interact with the MapView application to interact with the center display and/or passenger display in a same manner as if the user interacted with center display and/or passenger screen directly. The MapView application may also present similar or the same user interfaces to the user as those displayed by the center display and/por passenger screen.

The center display may be a primary display for the MapView system (also referred to as the primary MapView system). Each additional display (e.g., passenger screen, MapView application executing on a device, instance of a MapView system operating on another device, mobile device, computer, other passenger screens (not shown), etc.) may be referred to as secondary displays. Each secondary display may present an extended (e.g., a same or similar) user interface as the user interface being displayed by the primary display. When a user interacts with the primary display (e.g., altering the representation of a geographical area, etc.), each secondary display may mirror the changes made at the primary display. Each secondary display may be independently operable by a passenger to display different representations of different portions of different geographical areas than the representation and/or geographical area being displayed by the primary display. For example, each secondary display may include an input/output interface, include touchscreen capabilities, voice control capabilities, etc. allowing a user to manipulate an instance of the MapView system. The instance of the MapView system may be a separate MapView system or a subprocess of the MapView system. Changes made by a secondary display can cause a corresponding change to be displayed by the primary display and/or display a different user interface from that of the primary display. The secondary display may provide similar or the same functionality as the MapView system of the primary display. For example, users can search for media streams and/or broadcast sources through icons within the representation of the geographical area being displayed, filter media streams and/or broadcast sources, search through text or other constraints (e.g., genre, location, etc.), or any other function or service provided by the MapView system as previously described. etc. The functionality may be provided by processing hardware of the secondary display or by the same processing hardware of the MapView system (e.g., as described in connection to FIG. 1).

Figure 5:
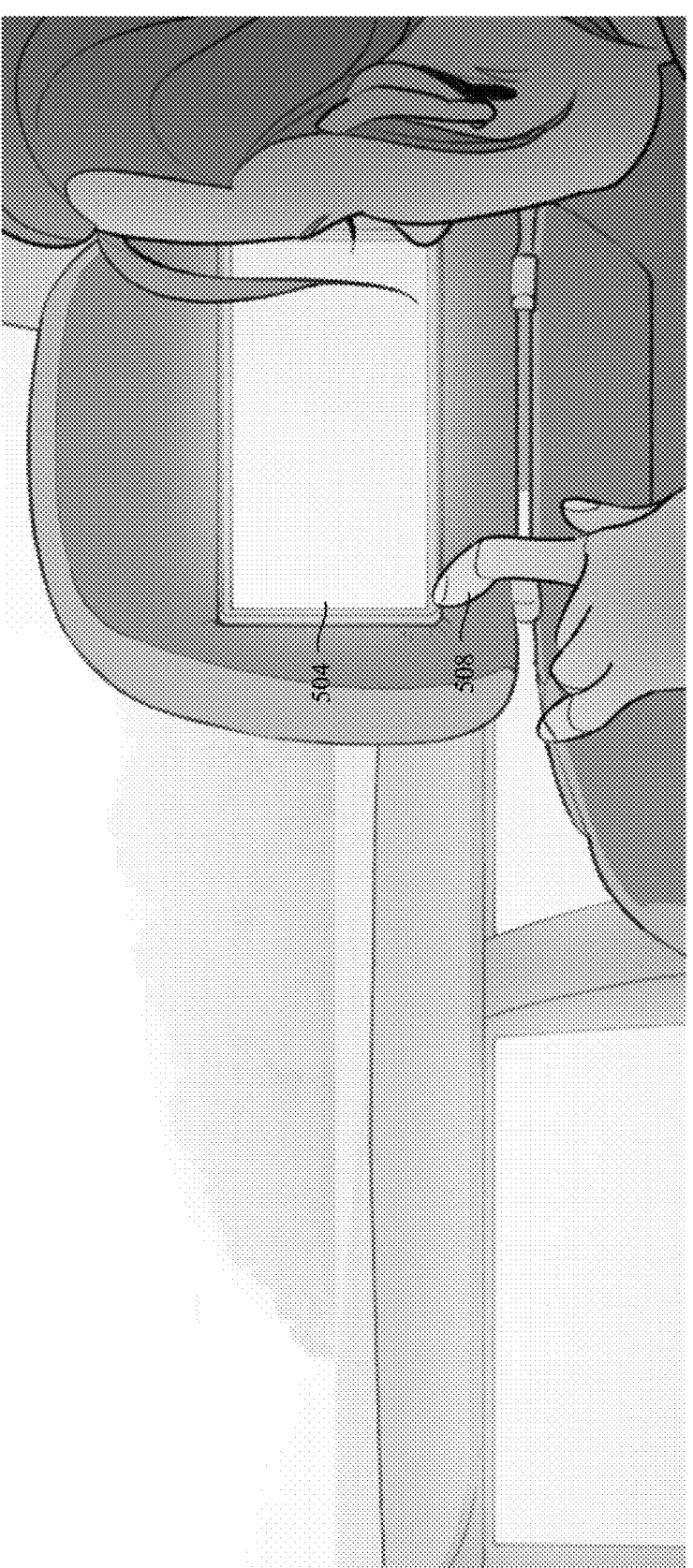
FIG. 5 is another example illustration of a MapView system operating within a vehicle according to aspects of the present disclosure

FIG. 5 is another example illustration of a MapView system operating within a vehicle according to aspects of the present disclosure. In some instances, passengers may interact with the MapView system (e.g., referred to as the primary MapView system) through one or more secondary displays (e.g., operating an instance of the MapView system, a MapView application, a MapView process, etc.) to contribute to the identification of new media streams and/or broadcast sources. Secondary display 504 may be a touchscreen enabling touch-based control of an instance of the MapView system. The passenger may interact (e.g., through gestures 508 etc.) with secondary display 504 to enable any of the previously described functionality of the MapView system. In some instances, the passenger may interact with the secondary display to search for new media streams and/or broadcast sources (e.g., by interacting with a user interface displaying a representation of a geographical area, text searching, searching by category or other constraint, etc.), filter currently displayed media streams and/or broadcast sources, select a media stream and/or broadcast source for presentation, receive and/or display additional information corresponding to a current presenting media stream or broadcast source, and/or the like.

If the passenger selects a new media stream or broadcast source for presentation, a notification may be transmitted to the driver. The notification may be displayed on the primary display, a heads-up display, verbally spoken to the driver (e.g., via an automated assistant, etc.), combinations thereof, or the like. The driver may then determine whether to approve the new media stream or broadcast source for presentation. If the driver approves, then the new media stream or broadcast source may be presented by the in-vehicle entertainment system (e.g., speakers of the vehicle, etc.). If the driver ignores or denies the new media stream or broadcast source, then the currently presented media stream and/or broadcast source may continue. In either instance, a notification may be transmitted to the secondary display operated by the requesting passenger indicating whether the driver approved or denied the request to present the new media stream or broadcast source and/or whether the request timed out. To prevent distracting the driver, the passenger may be prevented from submitting a subsequent request for a predetermined time interval. Alternatively, or additionally, the passenger may transmit a predetermined quantity of such requests with a time interval. If too many requests are received with the time interval, the passenger may be prevented from submitting subsequent requests.

In some instances, users may operate other devices as a secondary display. A secondary display may include any device configured to execute an instance of the MapView system (or a component thereof), a MapView application, a process of a MapView system, and/or the like. Examples of devices include, but are not limited to, mobile devices (e.g., smartphone, tablet, etc.), computing device (e.g., a computer, server, etc.), application-specific integrated circuit, field programmable gate array, etc. A secondary display operating remotely from the primary MapView system may enable passengers to continue to interact with the primary MapView system when outside the vehicle. For example, while stopped, the passenger may interact with the MapView system operating within the vehicle from a mobile device while the passenger is stretching their legs. A secondary display operating remotely from the primary MapView system also may enable remote users to participate in a road trip or other MapView experience.

The secondary displays may communicate with the MapView system operating in the vehicle using a direct connection (e.g., Bluetooth, Wi-Fi, Zigbee, Z-wave, ethernet, universal serial bus, etc.) or an indirect connection (e.g., in which the other devices transmit communications through one or more communication nodes such as, for example, the Internet, a server, computing devices, etc., to reach the MapView system operating in the vehicle).

Secondary displays may communicate with the MapView system operating within the vehicle from any location. For example, during a road trip, the driver may share access to the MapView system with one or more other users so that the one or more other users can share in the experience of the road trip with the driver and passengers. The MapView system may enable verbal and/or text communications, notifications, and/or the like through the devices accessing a same MapView system to enable devices access the MapView system from outside the vehicle to communicate with the those inside the vehicle (e.g., the driver, the passengers, etc.). In some instances, text-based communications and/or notifications may be passed through a text-to-speech service to prevent interfering with the operation of the vehicle. The driver and/or the passengers may authorize and/or revoke authorization to access the MapView system. The driver and/or the passengers may also authorize and/or revoke authorization to communicate through the MapView system.

The primary MapView system may use a multi-layer security to secure the primary MapView system from unauthorized access from external devices and/or unauthorized secondary displays. Secondary displays may request access to a primary MapView system using access credentials, public/private keys, an access token, and/or the like. Access credentials may be defined by a user of the MapView system. Access tokens and/or public/private keys may be stored in internal memory of the MapView system. When a secondary display requests access to the primary MapView system, the device may transmit its access token to authenticate the secondary display as a legitimate and authorized instance of the MapView system, MapView Application, MapView process, etc. The primary MapView system may compare the received access token to an internal token table. If a matching entry is identified, then the secondary display may be considered authentic. Public/private keys may be used to encrypt transmissions to and from the primary MapView system and/or instances of the MapView system.

Once secondary display is granted access to the primary MapView system, the primary MapView system may share data with the secondary display. The shared data may include, but is not limited to, a location of the primary MapView system, information associated with media being presented by the primary MapView system (e.g., title, album, artist, release date, liner notes, interesting facts, etc.), information associated with a current broadcast source to which the primary MapView system is connected, information associated with a historical broadcast source to which the primary MapView system has been connected, an identification of the devices connected to the primary MapView system, a location of the devices connect to the primary MapView system, communications transmitted during the current defined session, an identification of media queued for presentation through the primary MapView system, the representation of the geographical area presented by the primary MapView system, the representation of the geographical area presented by a secondary display or another primary MapView system, combinations thereof, or the like.

In some examples, the primary MapView system may manage communications between secondary display connected to the primary MapView system. For instance, an instance of the MapView system operating on a mobile device may communicate with a secondary display within a vehicle. The primary MapView system may receive communications from the mobile device and forward the communications to the secondary display. In some instances, the MapView system may encrypt communications that are to be transmitted through indirect communications to prevent unauthorized communications, spam, unauthorized access attempts, etc. from affecting the primary MapView system and/or secondary display connected to the primary MapView system. In those instances, communications transmitted over direct communications may not be encrypted as the source and/or destination of the communications are more likely to be known to the primary MapView system and directly connected secondary displays. Alternatively, the primary MapView system may encrypt all communications being transmitted through the primary MapView system.

Access to the primary MapView system may be granted indefinitely or for a predetermined period (e.g., such as a defined session based on the duration of a road trip, time, distance, etc.). The primary MapView system may determine when a predetermined period is to be terminated (e.g., via determining that the primary MapView system is located at a navigation destination, time, distance, combinations thereof, or the like). When the defined session terminates, the primary MapView system may terminate the connections with any device that does not have indefinite access rights.

FIG. 6 is a flowchart of an example process for identifying media streams based on a real-time geolocation according to aspects of the present disclosure. At block 604, a MapView system may display a first representation of a first portion of a first geographical area. The first geographical area may include the Earth or any region thereof, an extraterrestrial location (e.g., Mars, Titan etc.), a fictional location (e.g., from literature, a movie, etc.), or the like. The representation may be a graphical representation of the first portion of the first geographical area such as, but not limited to, a globe, a map, etc. Alternatively, or additionally, the representation may be non-graphical such as text or any other non-graphical representation, etc.

The first representation may include icons representing locations of a first set of broadcast sources within the first portion of the geographical area. In some instances, the first representation may include other icons, objects, identifiers, etc. representing other locations within the first portion of the first geographical area (e.g., an identification of street names, locations associated with media streams or particular media, an identification of notable locations such as historic locations or locations frequently visited by users, an identification of landmarks, an identification of other types of broadcast sources (e.g., non-radio information sources, or the like), etc.

The particular first representation, first portion of the first geographical area, first geographical area, and/or first set of broadcast sources may be selected based on an identification of a user of the MapView system. When a user first accesses the MapView system, the MapView system may identify the user. In some instances, the MapView system may request that the user login in to the MapView system using access credentials (e.g., such as username and/or password). The MapView system may then access the user profile associated with the access credentials. In other instances, the MapView system may use other information to infer the identity of the current user. For example, if the MapView system may determine an identity of a user based on a key fob used to access a vehicle within which the MapView system is operating. Initially, the user may associate the key fob with a user profile (e.g., using a user identifier and/or access credentials as previously described). The MapView system may store signal information associated with the key fob (e.g., frequency, channel, modulation, signal strength, etc.) and/or an identifier associated with the key fob. When the user uses the key fob to unlock or otherwise access the vehicle, the MapView system may also receive the signal. The MapView system may then identify the key fob based on the signal information and identify the user based on identifying the key fob. Alternatively, the MapView system may receive an identification the key fob used to access the vehicle from a component of the vehicle. The MapView system may then identify the user from the identification of the key fob.

In another example, the MapView system may identify the current user from a device in communication with the MapView system. For instance, the MapView system and/or the in-vehicle entertainment system may be connected to a mobile device (e.g., via Bluetooth, Wi-Fi, or the like). The mobile device may be executing a MapView application or companion application to the MapView system that has already identified the current user. The MapView application or companion application may transmit an identification of the user and/or the user profile to the MapView system. The MapView system may then access the user profile associated with the identified user. Alternatively, the user may be identified without the mobile device executing a MapView application or companion application. The MapView system may store an association of the current user with an identifier of the mobile device. Examples of identifiers of the mobile device that may be used include, but are not limited to, an Internet Protocol address, a Media Access Control Address, a mobile ad identifier (MAID) of the mobile device, a model identifier, a software version operating on the mobile device, a model number, a serial number, a carrier used by the mobile device, combinations thereof, or the like. When the mobile device connects to the MapView system or in-vehicle entertainment system, the MapView system may identify the mobile device then identify the user associated with the identified mobile device. The MapView system may then access the user profile associated with the identified user.

The MapView system may use other characteristics and/or methods in addition to or in place of those previously described to identify the current user. For example, the MapView system may use sensor data to identify the current user. The MapView may receive sensor data from sensors of the vehicle (e.g., when the MapView system is operating within the vehicle) or internal sensors (e.g., of the MapView system, a mobile device, or the like). The MapView system may define a pattern that corresponds to the user using the sensor data. In some instances, the MapView system may use a machine-learning model to process the sensor data and predict an identify of the user that corresponds to the sensor data. The machine-learning model may be trained using historical sensor data corresponding to the user (using supervised or unsupervised learning). The machine-learning model may then generate a set of predictions and a set of corresponding probabilities that indicate the confidence that each prediction of the set of predictions is accurate. The MapView system may then determine the identity of the current user based on the predicted user with a highest corresponding probability.

Examples of sensor data usable by the MapView system to define a pattern of a user include, but are not limited to, locations of the user, routes traveled by the user, average speed, breaking events (e.g., as determined by one or more accelerometers and/or speedometers, etc.), frequently traveled routes, frequently traveled locations, frequently access media streams or broadcast sources, frequently used devices (e.g., those used to access the MapView system, those used to communicate with the MapView system, and/or other devices), combinations thereof, or the like. The machine-learning model use discriminant analysis (linear, quadratic, logarithmic, etc.), K-nearest neighbor or K-means clustering, Naïve Bayes, neural networks (recurrent neural networks, deep learning networks, etc.), support vector machines, Bayesian networks, principle component analysis, combinations thereof, or the like.

The MapView may select the first representation, the first portion of the first geographical area, the first geographical area, and/or the first set of broadcast sources based on the identity of the user. For example, the MapView system may select the first representation based on user preferences, a previous selection of a representation during a previous use of the MapView system by the user, an identification of other users in the vehicle or near the MapView System, or the like. Similarly, the MapView system may select the first portion and/or the first geographical area based on user preferences, a previous selection of a geographical area and/or a portion there of during a previous use of the MapView system by the user, a current location of the user (e.g., determined by global positioning system), other users in the vehicle or connected to the MapView system, combinations thereof, or the like.

If the MapView system cannot not identify the user, the MapView system may select a default representation, first portion of the first geographical area, and/or first geographical area (e.g., such as one based on the current location of the MapView system, or on any other criteria, etc.). Alternatively, the MapView system may randomly select the representation, the first portion of the first geographical area, the first geographical area, and/or the first set of broadcast sources (e.g., using a random number generator and thresholds).

At block 608, the MapView system may extract user characteristics from a first user device associated with the first representation of the first portion geographical area. The first user device may be a user device operating the MapView system (e.g., a mobile device, computing device, in-vehicle entertainment system, etc.) or another device in communication such as device. The user characteristics may include geospatial data indicative of a location of the first user device within the geographical area. In some instances, the geospatial data includes a global positioning system location or location determined by another process (e.g., signal triangulation, Internet Protocol address, a geofence, etc.). In other instances, the geospatial data includes a translation of a location of the first user device onto a different coordinate plane.

Since the MapView system may operate using extraterrestrial and/or fictional geographical locations, the MapView system may translate the current location of the first user device into a corresponding location within the extraterrestrial and/or fictional geographical location. The MapView system may define a distance ratio of a unit distance (e.g., a mile, a meter, kilometer, etc.) in each of three coordinate planes on Earth to a corresponding unit distance (e.g., a same distance unit or different) in each of three coordinate planes of the extraterrestrial and/or fictional geographical location. The MapView system may then determine when the first user device travels a predetermined distance on Earth, how far the first user device will travel within the extraterrestrial and/or fictional geographical location.

The user characteristics can be extracted from contemporaneous information associated with the first user device and/or user thereof such as characteristics received, generated, and/or derived over a proceeding predetermined time interval. In addition to geospatial data, the user characters its can be extracted from the user profile, sensors associated with the first user device (e.g., sensor of a mobile device, of a vehicle, etc.), activity data associated with the first user device (e.g., an movement properties such as acceleration, speed direction, and/or the like), historical media streams presented by the current user and/or the MapView system over the preceding predetermined time interval, combinations thereof, or the like.

A block 612, the MapView system may execute a machine-learning model using the user characteristics. The machine-learning model may be trained to generate a prediction of contemporaneous broadcast characteristics associated with at least one user of the first user device. The contemporaneous broadcast characteristics may correspond to an identification of media streams and/or broadcast sources that are predicted to be of interest to the current user at a particular time instant. For example, users may select a variety of media streams or broadcast sources for presentation. Users may be more likely to select certain media streams during certain time intervals than others. On the way home from work or school, users may be more likely to select certain media streams (e.g., such as those that reduce stress, that are informative, etc.). During a workout, those same users may be more likely to select different media streams such those that are higher energy. The contemporaneous broadcast characteristics correspond to a prediction of what the current user would likely select based on the current user's current circumstances.

The machine-learning model may be trained using training data received or derived from the user profile of the current user, historically selected media streams and/or broadcast sources selected or presented by the current user, and/or contextual information associated with each historically selected media stream and/or broadcast source (e.g., the current user's location, driving characteristics such as current or changes in acceleration or current or changes in speed, route information from a navigation system, activity data, current traffic, time of day, day of the week and/or year, weather information, social media information associated with the current user, etc.). In some instances, the training data can also include information associated with the current user (e.g., such as, but not limited to, demographic information, contact information, social media information, preferences of the current user, an identification of media applications used by the current user, an identification of media streams selected by the current user from the other media application, an identification of media stored by a device of the current user, combinations thereof, or the like), information associated with users connected to the current user (e.g., such as, but not limited to, friends, family, social media contacts, followed users, etc., wherein the information can include any of the information sources as previously described in connection to the current user), information associated with similar users to the current users (e.g., identified based on user characteristics, a location of the current user, a user profile of the current user, an identification of recently selected media streams and/or broadcast streams, combinations thereof, or the like, and wherein the information can include any of the information sources as previously described in connection to the current user), combinations thereof, or the like.

Sets of features may be extracted from the training data. Each set of features may include features representing data received and/or derived over a time interval. The set of features may then be processed into a feature vector to incorporate the time dimension into a machine-learning model input. Each feature vector may be processed by the machine-learning model to train the model to generate predictions that correspond to particular temporal circumstances. During training the machine-learning model may adjust internal weights that cause certain predictions to be output given particular feature vector. The larger the training data the more accurate the machine-learning model may be.

The machine-learning model can be trained using supervised or unsupervised learning. In some instances, after the machine-learning model is trained and in use, the machine-learning model may be trained using reinforcement learning. In those instances, the machine-learning model may predict a particular media stream or broadcast source that the user is likely to find of interest. If the current user selects the media stream and/or broadcast source or (if automatic presentation is enabled) allows the media stream and/or broadcast source to continue presenting, then the machine-learning model may consider the prediction to be accurate and adjust internal weights accordingly such that that prediction is more likely to be output from a similar input. If the current user does not select the media stream and/or broadcast source or turns to another media stream and/or broadcast source (or turns off the MapView system), then the machine-learning model may consider the prediction to be incorrect and adjust internal weights accordingly such that that prediction is less likely to be output from a similar input. Examples of machine-learning models that may be trained to generate the predictions as described include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

In some examples, the machine-learning model may use a feature vector generated from the user characteristics. A feature vector may include a set of features ordered based on to a data dimension so as to provide additional context to the machine-learning model processing the feature vector. A feature may correspond to any discrete measurable property or characteristic of the user characteristics. The data dimension may be based on a feature, feature type, common characteristic or associated data, etc. For example, a data dimension may be based on time, which may be usable to organize the set of features. Each feature may be associated with a time (e.g., in which the feature was generated, extracted, defined, stored, or the like). The MapView system may define the set of features, then generate the feature vector may ordering the set of features according to time associated with each feature. Examples of data dimensions usable to generate feature vectors include, but is not limited to, time, feature predictiveness (e.g., based on an assessment of feature and/or feature types during training of the machine-learning model), feature weight, user, combinations thereof, or the like.

At block 616, the MapView system may display a second representation of a second portion of a geographical area based on the contemporaneous broadcast characteristics. The MapView system may process the contemporaneous broadcast characteristics to determine how to modify the currently displayed representation of the first portion of the first geographical area to one that may be more of interest to the current user at the current time instant. The second geographical area may be a same or different geographical area from the first geographical area. The second portion of the second geographical area may be a same or different portion from the first portion of the first geographical area. The second representation may be a same or different representation from the first representation. The contemporaneous broadcast characteristics may include user input modify the first representation of the first portion of the geographical area. For example, the user input may include rotating the first representation to focus on a different portion of the first geographic area (e.g., where the first representation can be rotated along one or more axes such as x, y, and z axes, etc.), zooming in, zooming out, increasing or decreasing a resolution of the first representation.

In some instances, the second representation of the second portion of a geographical area may include icons representing locations of a second set of broadcast sources within the second portion of the geographical area. The second set of broadcast sources may include broadcast sources selected by the MapView system based on the contemporaneous broadcast characteristics or included in the contemporaneous broadcast characteristics. Alternatively, or additionally, the second set of broadcast sources may include broadcast sources resulting from an execution of a query and/or application of a filter by the current user. For example, the current user may search (via text, hard keys, touchscreen, remote communication from another device, and/or voice) for a particular type of broadcast source, request an identification of broadcast sources from a particular location, filter the first set of broadcast sources based on a constraint, etc. to define the second set of broadcast sources.

In some instances, the second portion of the second geographic area may be the same as the first portion of the first geographic area or may overlap with the first portion of the first geographic area. In those instances, the second set of broadcast sources may be equal to or a subset of the first set of broadcast sources. For example, the first portion of the first geographic area may include New York City Metropolitan area and the second portion of the second geographic area may include the Connecticut. At least a portion of the New York City Metropolitan area includes the Southwestern portion of Connecticut. The first set of broadcast sources and the second set of broadcast sources may both include those broadcast sources that are within the New York City Metropolitan area and Connecticut.

At block 620, the MapView system may facilitate a presentation of media from a particular broadcast source of the second set of broadcast sources. The MapView system may present the set of broadcast sources to the user for selection. The set of broadcast sources may be sorted based on the probability that the broadcast source is to be of interest to the user (e.g., as determined by the contemporaneous broadcast characteristics, the machine-learning model, and/or the like). Alternatively, the MapView system may use the machine-learning model to predict a particular media stream that will be of interest to the current user. The MapView system may cause the particular media stream to automatically be presented to the current user (e.g., through the first user device, through devices connected to the first user device such as displays and/or speakers, etc.). Alternatively, the MapView system may present the particular media stream to the current user for selection. Upon being selected by the current user, the MapView system may cause the particular media stream to be presented.

Facilitating the presentation of the media may include use of one or more components of the first user device. For example, in a vehicle, the MapView system may receive and decode at least a portion of the media from the broadcast source and pass the decoded media to the in-vehicle entertainment system causing the in-vehicle entertainment system to play the decoded media through speakers of the vehicle. If the media has a visual component the central display of the in-vehicle entertainment system may be used to display the visual component. Mobile device and computing devices may operate similarly, the MapView system may obtain the media and decoded then pass the decoded media through an application programming interface exposed by an operating system or kernel of the respective device to a component connected to speakers and/or a display device.

In some instances, the selection of the particular broadcast source may be based on one or more other devices. For example, the MapView system may identify broadcast sources that other MapView systems within a predetermined distance from the first user device are presenting. The MapView system may select a broadcast source from the identified broadcast sources (based on user input, user preferences, the contemporaneous broadcast characteristics, and/or the like). In that example, a first user may request an identification of broadcast sources that nearby users are listening to. The identified broadcast sources may be filtered based on the contemporaneous broadcast characteristics to reduce the quantity of the identified broadcast sources to those that may be of interest to the first user. The first user may then select the particular broadcast source from the filtered broadcast sources to listen to a same broadcast source as those users that are nearby.

In another example, passengers in a vehicle may have access to secondary display devices connected to the in-vehicle entertainment system. The passengers may interact with the MapView system through the secondary display. A passenger may request a media stream or broadcast sources be presented. The driver may receive a notification that includes an identification the request, an identification of the requested media stream or broadcast source, an identification of the passenger and/or secondary display that submitted the request, etc. The driver may then accept the request (and present the requested media stream or broadcast source) or deny the request. The passenger can select whether to synchronize the user interface displayed by the secondary display device with the user interface being displayed by the primary display device. When synchronized, the secondary display devices may mirror what is being presented by a primary display device (e.g., the representations of the geographic areas, etc.). The passenger may interact with the user interface of the secondary display device to modify the representation of the geographic area displayed by the primary display device. If the passenger does not synchronize the display devices, the passenger may manipulate the representation of the geographic area being displayed using the secondary display device (e.g., as a touchscreen or through an input device) such that the user interface displayed to the passenger may be different from the user interface displayed to the driver (e.g., different representation, different geographic area or portion thereof, different icons being displayed, etc.)

FIG. 7 is a flowchart of an example process for geospatial identification and presentation of media streams according to a real-time geolocation according to aspects of the present disclosure. A media device can be provisioned to present media streams from various broadcast sources. The media device may be a mobile device (e.g., such as a smartphone, tablet, etc.), computing device (e.g., such as a desktop computer, server, etc.), an in-vehicle entertainment system, specialized electronic device (e.g., such as a field-programmable gate array, application-specific integrated circuit, etc.), and/or the like. In some instances, the media device may be a device operating a MapView system, an instance of a MapView system, a MapView application, a MapView process (e.g., a process of a MapView system operating on one or more other devices), or the like. The media device may be configured to receive media from broadcast sources over one or more communication channels (e.g., radio, the Internet, local memory, nearby devices via a wired or wireless connection, etc.). The media device may execute various processes configured to identify broadcast sources and/or media streams for presentation by the media device.

At block 704, the media device may display a user interface that includes a first representation of a geographical area. The geographical area may be, but is not limited to, the Earth; another planet; a location from a fictional work such as from a film, television show, book, other works of fiction; or any other location real or fictional. In some instances, the geographical area may be a representation of a real location during a particular time interval (e.g., such as the Earth Mesozoic era of the Earth, etc.). The first representation of the geographic area may be a portion of the geographic area configured for display by the user interface. The portion of the geographic area may correspond to a contextually relevant location (e.g., to the media device, the user operating the media device, media being presented by the media device, combinations thereof, or the like) such as, but not limited to, a current or historical location of the media device, a home address of a user, a location in which a current media stream is being broadcast from, a location in which a preferred media stream broadcasts from, a last location that was in view during a previous instance in which the user interface was presented, user input, characteristics of a user operating the media device, a current location of the media device, or the like. In some instances, the portion of the geographical area that is displayed by the user interface may be randomly selected (e.g., using a random number generator, or the like) or selected based on user characteristics and/or a user profile). For example, a user profile may include language preferences of the user. The first representation of the geographical area may display an area of the geographical area in which a language of the language preferences is spoken.

The user interface may include a first set of icons representing broadcast sources that are broadcasting media streams. When the geographical area corresponds to a real location, each icon of the first set of icons may be positioned within the first representation of the geographical area at a location of the geographical area that corresponds to the physical location of the broadcast source. A large quantity of broadcast sources may be physical located within the geographical area. The media device may limit the quantity of icons to be included in the first set of icons to make it easier to distinguish between icons. The media device may define a quantity of icons that can be displayed by the first representation of the geographical area (e.g., based on characteristics of the broadcast sources, user preferences, user input, how close the broadcast sources are to each other, etc.). If there are more broadcast sources than the permitted quantity of icons, then the media device may select from the broadcast sources those broadcast sources to be displayed (e.g., as an icon).

In some examples, the media device may select broadcast sources based one or more parameters such as, but are not limited to, user preferences (e.g., genre, language, sports teams, location, etc.), historical broadcast sources accessed by the user, broadcast sources marked as 'Favorite' or 'Preferred', user input, a random number generator, combinations thereof, or the like. For example, the media device may generate a hierarchy of broadcast sources that are physical located within the geographical area based on any of the aforementioned parameters. The media device may then select from the hierarchy the broadcast sources based on the higher-ranking broadcast sources in the hierarchy.

An icon may indicate a particular location of a broadcast source within the geographical area using a pointer, pin, speech bubble, arrow, or other graphical depiction. The icon may also include a graphical representation of the broadcast source, a media stream being broadcast by the broadcast source, a particular song or program currently being presented by the media steam. The graphical representation may include, but is not limited to, a logo, album cover art of a song or program being presented, an image or representation of an artist of a song or program being presented, etc. The graphical representation may change over time such as each time a new song is being presented by a media stream, etc.

At block 708, the media device may receive input indicative of a change associated with the geographical area. The input may be received from one or more secondary displays connected to the media device via direct communications or indirect communications. The one or more secondary displays may be any device operating a MapView system, an instance of a MapView system, a MapView application, a MapView process (e.g., a process of a MapView system operating on one or more other devices), or the like. Each secondary display may display a same or similar user interface as the media device and/or present media from one or more broadcast sources.

The input may be used to manipulate the first representation of the geographical area and/or information associated with the geographical area such as, but not limited to, an identification of broadcast sources, an identification of media streams, an identification of landmarks, an identification of locations of interest, user preferences, user selected locations, and/or the like. The input may be received from the user (e.g., via a physical control such as a button, dial, etc.; touchscreen gesture; a voice command, a communication such as a text message or notification; combinations thereof; the like), from a sensor associated with the media device or secondary displays (e.g., an accelerometer, gyroscope, magnetometer, clock, global positioning system (GPS), and/or the like), combinations thereof, or the like. Input received from sensors associated with the media device (or secondary displays) may be receive in real time, in batches, in regular intervals, and/or the like.

For example, the media device may receive an indication of touchscreen input from a touchscreen of a secondary display that corresponds to a request to zoom-out of the portion of the geographical area represented by the first representation of the geographical area (e.g., using pinching motion on the touchscreen or other predefined zoom-out motion), zoon-in to the portion of the geographical area represented by the first representation of the geographical area (e.g., using a reverse pinching motion on the touchscreen or other predefined zoom-in motion), moving the portion of the geographical area to be represented (e.g., using a swiping motion on the touchscreen in the direction in which the first representation of the geographical area is to be moved or other predefined moving motion), rotating the first representation of the geographical area (e.g., using a swiping motion on the touchscreen relative to a fixed point of the touchscreen, or other predefined rotation motion), etc. Other user input may be received to cause other types of changes to the first representation of the geographical area.

In some examples, the input may include a change to the quantity or type of information presented within the first representation of the geographical area. For example, the input may correspond to a query, filtering criteria, combinations thereof, or the like. A query may be executed to identify particular broadcast sources, a media streams, landmarks, locations of interest, user selected locations (e.g., such as locations marked by a user, a home city, a home state, a home country, a home address, and/or the like) and/or the like that may be located within the first representation of the geographical area. Filtering criteria may be used to remove one or more pieces of information (e.g., identification of broadcast sources, an identification of media streams, an identification of landmarks, an identification of locations of interest, user selected locations, and/or the like) within the first representation of the geographical area. For example, filtering criteria may be received selecting a particular genre causing the media device to remove icons from the user interface representing broadcast sources (or media streams) that do not correspond to the particular genre.

In some examples, the input may correspond to a selection of a different geographical area. The geographical area may correspond to the Earth, another planet, a location from a fictional work (e.g., such as from a film, television show, book, other works of fiction, and/or the like), the Earth as it appeared during a particular time period or era, or the like. The input may change the geographical area from a first geographical are (e.g., Earth, etc.) to another geographical area (e.g., mars, etc.). When using a non-Earth geographical area, the media device may select locations within the representation of the geographical area that correspond to broadcast sources. The locations may be approximately the same as the real-world locations of the broadcast sources (e.g., relative to other broadcast sources to be placed in the representation of the geographical area) or may be selected according to other factors (e.g., based on characteristics of the broadcast sources, characteristics of the user, characteristics of the geographical area, user input, etc.).

In some examples, the input may include sensor measurements configured to modify the portion of the geographical area that is represented and/or the orientation of the portion of the geographical area that is represented. The media device (or one or more secondary displays) may include one or more sensors usable to control an appearance of the geographical area. Alternatively, or additionally, the media device (or one or more secondary displays) may receive sensor data from one or more nearby devices. For example, the media device may be a component of an in-vehicle entertainment system that can receive GPS data from a navigation component of the vehicle. The first representation of the geographical area may be centered over a current location of the media device (or one or more secondary displays) within the geographical area. Alternatively, the first representation of the geographical area may be centered over a virtual location of the media device (or one or more secondary displays) within the geographical area (e.g., such as when the geographical area is non-Earth based, when the virtual location corresponds to a particular location on Earth other than the current location of the media device, etc.). The input may correspond to measurements from the one or more sensors indicating a change in the location of the media device (or one or more secondary displays) within the geographical area. The input may be used by the media device to adjust the representation of the geographical area so that the representation of the geographical area remains centered over the location of the media device (or one or more secondary displays) within the geographical area. The media device may adjust the representation of the geographical area based on movement of the media device (or one or more secondary displays), changes in direction of the media device (or one or more secondary displays), changes in elevation of the media device (or one or more secondary displays), changes in an orientation of the media device (or one or more secondary displays) (e.g., pitch, yaw, and/or roll, etc.), combinations thereof, or the like.

The media device may simultaneously receive input from both the user and from the one or more sensors associated with the media device (or one or more secondary displays).

At block 712, the media device may modify the user interface to include a second representation of the geographical area based on the change associated with the geographical area and a second set of icons representing broadcast sources. The second representation of the geographical area may correspond to the first representation of the geographical area modified according to the change associated with the geographical area. If the input included a selection of a new geographical area, then the second representation of the geographical area may correspond to a representation of the new geographical area.

The second set of icons may represent broadcast sources that are same as or different from the first set of icons. In some instances, the second set of icons represents a subset of the first set of icons. For example, if the input corresponds to a zoom-in command, then a smaller portion of the geographical area may be represented by the second representation. The second set of icons may include those icons of the first set of icons that are still located within the geographical area represented in the second representation of the geographical area.

Alternatively, the media device may maintain a quantity if icons presented within the representation of the geographical area. The second set of icons may represent broadcast sources located within the geographical area represented within the second representation of the geographical area. In some instances, the media device may first select those icons of the first set of icons having a location that is within the second representation of the geographical area. If the quantity of selected icons is less than the quantity to be included in the second representation of the geographical area, then the media device may generate one or more new icons representing broadcast sources that are within the second representation of the geographical area and that correspond to one or more selection criteria (e.g., a genre, a language, historical broadcast sources access by the user, user input, user preferences, etc.).

The media device may transmit the user interface including the second representation of the geographical area to the one or more secondary displays. The one or more secondary displays may be configured to mirror the user interface presented (or generated) by the media device. Alternatively, the secondary display may present a different user interface generated based on the user interface presented (or generated) by the media device. For example, the media device may be a component of an in-vehicle entertainment system configured to present a user interface enabling a driver to interact with the media device. To avoid distracting or confusing the driver, the interface presented by the media device may include less information (e.g., fewer displayed controls or buttons, fewer icons, smaller map, map being in a zoomed-in state, map being in a zoomed-out state, combinations thereof, or the like). The secondary displays may be operated by passengers whose distraction is not an issue. The secondary display may present a different version of the user interface (e.g., more displayed controls or buttons, more icons, larger map, map being in a zoomed-in state, map being in a zoomed-out state, combinations thereof, or the like) generated based on the user interface received from the media device. Alternatively, the different version of the user interface may generated by the media device.

At block 716, the media device may receive input corresponding to a particular icon of the second set of icons. The input may be received from a secondary display of the one or more secondary displays, the user (e.g., using a button, touchscreen, voice command, etc.), from one or more sensors of the media device (or one or more secondary displays), and/or from the media device. For example, sensor measurements indicating that the media device (or one or more secondary displays) is in motion may cause the media device to select a first icon of the second set of icons corresponding to a broadcast source broadcasting the user's preferred musical genre on a highway. Sensor measurements indicating that the media device (or one or more secondary displays) is stopped or is in stop-and-go traffic may cause the media device to select a second icon of the second set of icons corresponding to a broadcast source broadcasting the user's preferred musical genre while in traffic.

In some instances, the input may be generated by the media device so as to enable automatic selection of the particular icon. For example, the input may be generated based on a machine-learning model configured to process information associated with the user to predict an icon (or broadcast source, media stream, genre, program, song, artist, etc.) that the user may enjoy (as previously described). The media device may receive the prediction as the input. The machine-learning model may include any model configured to generate predictions based on historical data such as, but not limited to a classifier. Examples of such machine-learning models include, but are not limited to, perceptrons, decision trees, Naïve Base, a regression-based model (e.g., such as logistic, etc.), neural network, deep learning networks, support vector machines (SVM), Naïve Bayes, K-nearest neighbor, combinations thereof, or the like.

The machine-learning model may be trained using training data received and/or derived from information associated with the user such as, but not limited to, demographic information, user profile information, user preferences, characteristics of the user, characteristics of other users similar to this user (e.g., as determined by demographic information, listening history, listening preferences, location, etc.), media streams previously presented by the media device, media streams previously presented to similar users to this user, information received and/or derived from other devices operated by the current user such devices in communication with the media device, devices operated by users associated with the current user (e.g., friends, family, social media contacts, device contacts, devices that previously presented media streams that satisfy one or more of the constraints, etc.), combinations thereof, or the like.

Alternatively, or additionally, the machine-learning models may be trained using media streaming data associated other devices (e.g., such as devices similar to the media device, devices executing a MapView system or MapView application, secondary displays, devices executing a media streaming application, etc.). The machine-learning model may be trained using supervised training, supervised training, semi-supervised training, reinforcement training, combinations thereof, or the like.

Once trained, the media device may define a feature vector from features extracted from information associated with the user, the first set of icons and features extracted from the second representation of the geographical area (and/or features extracted from information associated with the user, the second set of icons, and features extracted from the first representation of the geographical area). The feature vector may be passed as input into the trained machine-learning model. The machine-learning model may be executed using the feature vector to generate one or more icon predictions corresponding to the second set of icons. Each prediction may include a confidence value indicative of a degree in which the prediction fits the input feature vector and/or information associated with the user. The media device may then select as the input, the prediction having a highest confidence value.

In some instances, the machine-learning model may be configured to predict the first set of icons and/or the second set of icons. In those instances, the media device may predict the first set of icons by generating a feature vector including features extracted from information associated with the user and features extracted from the second representation of the geographical area. The machine-learning model may then generate a predicted first set of icons that correspond to broadcast sources that may be of interest to the user. The media device may predict the second set of icons by generating a feature vector including features extracted from information associated with the user, the first set of icons, and features extracted from the second representation of the geographical area. The machine-learning model may then generate a predicted second set of icons that correspond to broadcast sources that may be of interest to the user. The first set of icons and/or the second set of icons may be modified based on user input and/or other information associated with the user such as, but not limited to, broadcast sources designated as favorite, broadcast sources designated as not to be shown, broadcast sources currently broadcasting media designated as not to be presented (or not liked by the user), etc.

At block 720, the media device may facilitate presentation of a media stream being broadcast by a broadcast source corresponding to the particular icon. In some instances, the media device may facilitate presentation of a media stream being broadcast by a broadcast source by connecting to the media stream, decoding the media stream, and transmitting the decoded media stream to the one or more secondary sources that provided the input at block 708. Alternatively, when the secondary display is operating nearby to the media device (e.g., such as in a same vehicle), the media device may transmit visual information to the secondary display such as information associated with the media stream. In other instances, the media device may not include speakers or other means for presenting media. In those instances, the media device may facilitate presentation of the media stream by connecting to the media stream, decoding the media stream, and passing the decoded media stream to a media receiver configured to present the media stream (e.g., such as speakers, headphones, a television, a display device, etc.). In other instances, the media device may include components configured to present the media stream. In those instances, the media device may facilitate presentation of the media stream by connecting to the media stream, decoding media stream, and presenting the media stream using a component of the media device (e.g., based on the type of media of the media stream).

Figure 8:
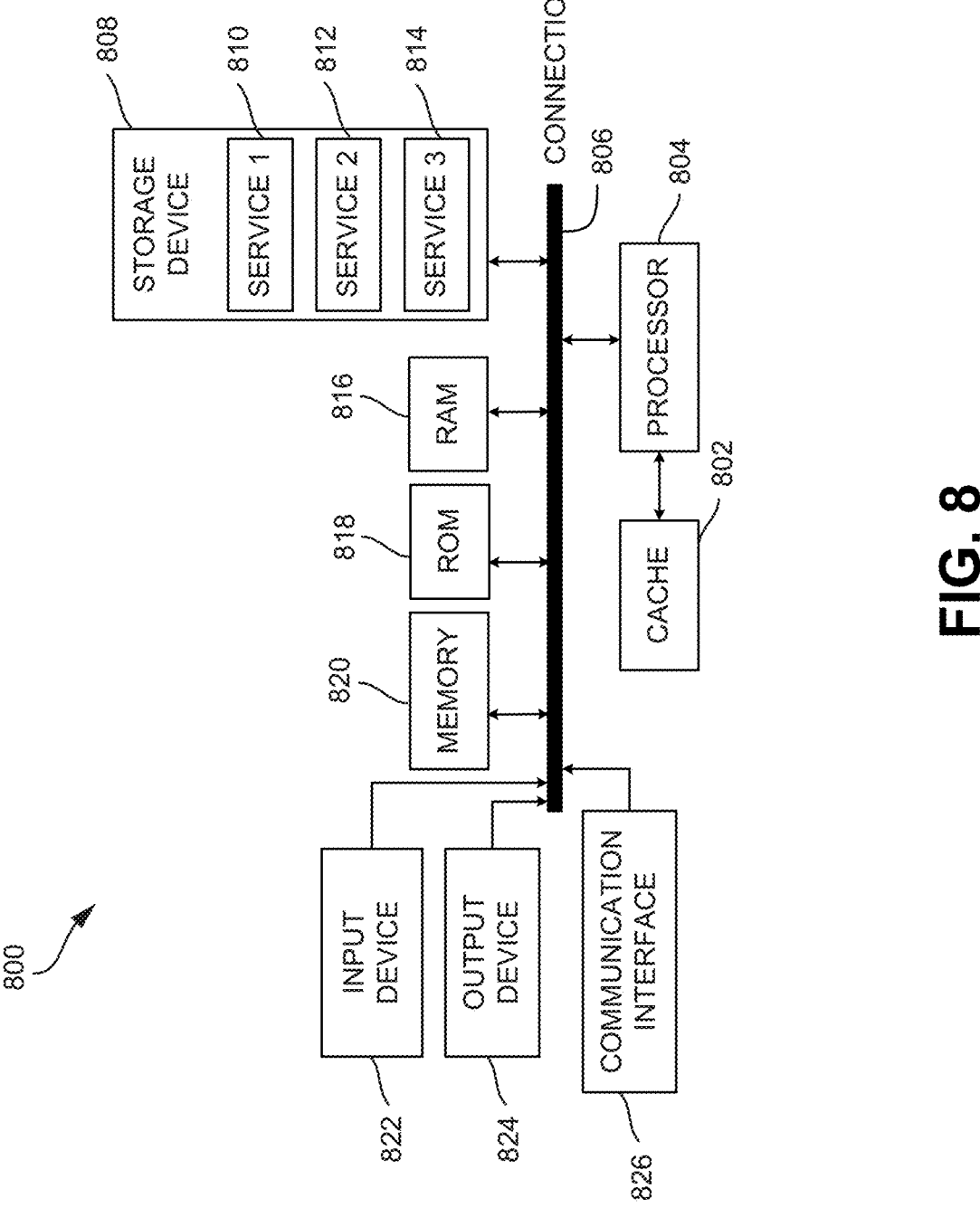
FIG. 8 illustrates an example computing device architecture of an example computing device that can implement the various techniques described herein according to aspects of the present disclosure.

FIG. 8 illustrates an example computing device according to aspects of the present disclosure. For example, computing device 800 can implement any of the systems or methods described herein. In some instances, computing device 800 may be a component of or included within a media device. The components of computing device 800 are shown in electrical communication with each other using connection 806, such as a bus. The example architecture of computing device 800 includes a processor 804 (e.g., CPU, processor, or the like) and connection 806 (e.g., such as a bus, or the like) that is configured to couple components of computing device 800 such as, but not limited to, memory 820, read only memory (ROM) 818, random access memory (RAM) 816, and/or storage device 808, to processing unit 810.

Computing device 800 can include a cache 802 of high-speed memory connected directly with, in close proximity to, or integrated within processor 804. Computing device 800 can copy data from memory 820 and/or storage device 808 to cache 802 for quicker access by processor 804. In this way, cache 802 may provide a performance boost that avoids delays while processor 804 waits for data. Alternatively, processor 804 may access data directly from memory 820, ROM 817, RAM 816, and/or storage device 808. Memory 820 can include multiple types of homogenous or heterogeneous memory (e.g., such as, but not limited to, magnetic, optical, solid-state, etc.).

Storage device 808 may include one or more non-transitory computer-readable media such as volatile and/or non-volatile memories. A non-transitory computer-readable medium can store instructions and/or data accessible by computing device 800. Non-transitory computer-readable media can include, but is not limited to magnetic cassettes, hard-disk drives (HDD), flash memory, solid state memory devices, digital versatile disks, cartridges, compact discs, random access memories (RAMs) 825, read only memory (ROM) 820, combinations thereof, or the like.

Storage device 808, may store one or more services, such as service 1 810, service 2 812, and service 3 814, that are executable by processor 804 and/or other electronic hardware. The one or more services include instructions executable by processor 804 to: perform operations such as any of the techniques, steps, processes, blocks, and/or operations described herein; control the operations of a device in communication with computing device 800; control the operations of processing unit 810 and/or any special-purpose processors; combinations therefor; or the like. Processor 804 may be a system on a chip (SOC) that includes one or more cores or processors, a bus, memories, clock, memory controller, cache, other processor components, and/or the like. A multi-core processor may be symmetric or asymmetric.

Computing device 800 may include one or more input devices 822 that may represent any number of input mechanisms, such as a microphone, a touch-sensitive screen for graphical input, keyboard, mouse, motion input, speech, media devices, sensors, combinations thereof, or the like. Computing device 800 may include one or more output devices 824 that output data to a user. The one or more output devices 824 may include, but are not limited to, a media device, projector, television, speakers, combinations thereof, or the like. In some instances, multimodal computing devices can enable a user to provide multiple types of input to communicate with computing device 800. Communications interface 826 may be configured to manage user input and computing device output. Communications interface 826 may also be configured to managing communications with remote devices (e.g., establishing connection, receiving/transmitting communications, etc.) over one or more communication protocols and/or over one or more communication media (e.g., wired, wireless, etc.).

Computing device 800 is not limited to the components as shown if FIG. 8. Computing device 800 may include other components not shown and/or components shown may be omitted.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4"). The following examples are intended to Example 1 is a computer-implemented method comprising: displaying a first representation of a first portion of a first geographical area, wherein the first representation includes icons representing locations of a first set of broadcast sources within the first portion of the first geographical area; extracting user characteristics from a first user device, wherein the user characteristics include geospatial data indicative of a location of the first user device within the first geographical area; executing a machine-learning model using the user characteristics, the machine-learning model being configured to generate a prediction of contemporaneous broadcast characteristics associated with at least one user of the first user device; displaying a second representation of a second portion of a second geographical area based on the contemporaneous broadcast characteristics, wherein the second representation includes icons representing locations of a second set of broadcast sources within the second portion of the second geographical area; and facilitating a presentation of media from a particular broadcast source of the second set of broadcast sources.

Example 2 is the computer-implemented method of example(s) 1, wherein the first geographical area is Earth.

Example 3 is the computer-implemented method of example(s) 1, wherein the first geographical area is an extraterrestrial planet.

Example 4 is the computer-implemented method of example(s) 1, wherein the first geographical area is a fictional location.

Example 5 is the computer-implemented method of example(s) 1, wherein the location of the first user device is based on a global positioning system (GPS).

Example 6 is the computer-implemented method of example(s) 1, wherein the user characteristics further include activity data that indicates one or more activities associated with the first user device.

Example 7 is the computer-implemented method of example(s) 1, wherein the user characteristics further include historical activity data that indicates one or more activities associated with the first user device over a previous predetermined time interval.

Example 8 is the computer-implemented method of example(s) 1, wherein the geospatial data further indicates a rate of movement of the first user device and a direction.

Example 9 is the computer-implemented method of example(s) 1, wherein the contemporaneous broadcast characteristics includes a prediction of media that a user of the first user device would find of interest.

Example 10 is the computer-implemented method of example(s) 1, wherein displaying the second representation of the second portion of the second geographical area is further based on user interaction with the first representation of the first portion of the geographical area.

Example 11 is the computer-implemented method of example(s) 10, wherein the user interaction is received via a touchscreen display.

Example 12 is the computer-implemented method of example(s) 10, wherein the user interaction is received via voice controls.

Example 13 is the computer-implemented method of example(s) 10, wherein the user interaction is received via hard keys mounted on a steering wheel of a vehicle.

Example 14 is the computer-implemented method of example(s) 1, further comprising: receiving, from a second user device, user input identifying a first broadcast source from the second set of broadcast sources; receiving, at the first user device, a notification including an identification of the first broadcast source and an identification of the second user device; receiving, by the first user device, a confirmation associated with the first broadcast source; and facilitating a presentation of media of the first broadcast source.

Example 15 is the computer-implemented method of example(s) 14, wherein the first user device is an in-vehicle entertainment system accessible to a driver of a vehicle and the second user device positioned so as to be accessible by a passenger of the vehicle.

Example 16 is the computer-implemented method of example(s) 1, wherein the first user device is a mobile device.

Example 17 is the computer-implemented method of example(s) 1, wherein the second set of broadcast sources is determined by: generating a list of broadcast sources that includes broadcast sources being presented by one or more user devices proximate to the first user device; and filtering the list of broadcast sources based on the contemporaneous broadcast characteristics to define the second set of broadcast sources.

Example 18 is the computer-implemented method of example(s) 1, further comprising: receiving a query that include a media type; identifying one or more broadcast sources of the second set of broadcast sources that broadcast media corresponding to the media type; and removing, from the second representation of the second portion of the second geographical area, icons representing locations of broadcast sources of the second set of broadcast sources other than the one or more broadcast sources, wherein the particular broadcast source is one of the one or more broadcast sources.

Example 19 is a method comprising: displaying a user interface that includes a first representation of a geographical area and a first set of icons representing broadcast sources, each icon being positioned at a location of the geographical area that corresponds to a physical location of the broadcast source; receiving input indicative of a change associated with the geographical area; modifying the user interface to include a second representation of the geographical area based on the change associated with the geographical area and a second set of icons representing broadcast sources; determining a input corresponding to a particular icon of the second set of icons; and facilitating a presentation of a media stream of a broadcast source corresponding to the particular icon of the second set of icons.

Example 20 is a system comprising: one or more processors; and a non-transitory machine-readable medium storing instructions that when executed by the one or more processors, cause the one or more processors to perform any of example(s)s 1-19.

Example 21 is a non-transitory machine-readable medium storing instructions that when executed by one or more processors, cause the one or more processors to perform any of example(s)s 1-19.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A computer-implemented method comprising:
displaying a first representation of a first geographical area including icons representing locations of a first set of broadcast sources within the first geographical area;

extracting user characteristics from a first user device, wherein the user characteristics include geospatial data indicative of a location of the first user device within the first geographical area;

receiving an identification of a second geographical area to simulate, wherein the second geographical area is different from the first geographical area;

executing a machine-learning model using the user characteristics and the identification of the second geographical area, the machine-learning model being configured to generate a prediction of contemporaneous broadcast characteristics associated with the second geographical area, wherein the contemporaneous broadcast characteristics include an identification of a simulated location of the first user device within the second geographical area;

displaying a second representation of the second geographical area based on the contemporaneous broadcast characteristics, wherein the second representation includes icons representing locations of a second set of broadcast sources within the second geographical area, and wherein the locations of the second set of broadcast sources are selected based on the simulated location of the first user device; and facilitating a presentation of media from a particular broadcast source of the second set of broadcast sources.

2. The computer-implemented method of claim 1, wherein the first geographical area is Earth.

3. The computer-implemented method of claim 1, wherein the first geographical area is a fictional location.

4. The computer-implemented method of claim 1, wherein the location of the first user device is based on a global positioning system (GPS).

5. The computer-implemented method of claim 1, wherein the user characteristics further include activity data that indicates one or more activities associated with the first user device.

6. The computer-implemented method of claim 1, wherein the user characteristics further include historical activity data that indicates one or more activities associated with the first user device over a previous predetermined time interval.

7. The computer-implemented method of claim 1, wherein the contemporaneous broadcast characteristics includes a prediction of media that a user of the first user device would find of interest.

8. A system comprising:
one or more processors; and
a non-transitory machine-readable medium storing instructions that when executed by the one or more processors, cause the one or more processors to perform operations including:
displaying a first representation of a first geographical area; including icons representing locations of a first set of broadcast sources within the first geographical area;

extracting user characteristics from a first user device, wherein the user characteristics include geospatial data indicative of a location of the first user device within the first geographical area;

receiving an identification of a second geographical area to simulate, wherein the second geographical area is different from the first geographical area;

executing a machine-learning model using the user characteristics and the identification of the second geographical area, the machine-learning model being configured to generate a prediction of contemporaneous broadcast characteristics associated with the second geographical area, wherein the contemporaneous broadcast characteristics include an identification of a simulated location of the first user device within the second geographical area;

displaying a second representation of the second geographical area based on the contemporaneous broadcast characteristics, wherein the second representation includes icons representing locations of a second set of broadcast sources within the second geographical area, and wherein the locations of the second set of broadcast sources are selected based on the simulated location of the first user device; and facilitating a presentation of media from a particular broadcast source of the second set of broadcast sources.

9. The system of claim 8, wherein the first geographical area is Earth.

10. The system of claim 8, wherein the first geographical area is a fictional location.

11. The system of claim 8, wherein the location of the first user device is based on a global positioning system (GPS).

12. The system of claim 8, wherein the user characteristics further include activity data that indicates one or more activities associated with the first user device.

13. The system of claim 8, wherein the user characteristics further include historical activity data that indicates one or more activities associated with the first user device over a previous predetermined time interval.

14. The system of claim 8, wherein the contemporaneous broadcast characteristics includes a prediction of media that a user of the first user device would find of interest.

15. A non-transitory machine-readable medium storing instructions that when executed by one or more processors, cause the one or more processors to perform operations including:

displaying a first representation of a first geographical area including icons representing locations of a first set of broadcast sources within the first geographical area;

extracting user characteristics from a first user device, wherein the user characteristics include geospatial data indicative of a location of the first user device within the first geographical area;

receiving an identification of a second geographical area to simulate, wherein the second geographical area is different from the first geographical area;

executing a machine-learning model using the user characteristics and the identification of the second geographical area, the machine-learning model being configured to generate a prediction of contemporaneous broadcast characteristics associated with the second geographical area, wherein the contemporaneous broadcast characteristics include an identification of a simulated location of the first user device within the second geographical area;

displaying a second representation of the second geographical area based on the contemporaneous broadcast characteristics, wherein the second representation includes icons representing locations of a second set of broadcast sources within the second geographical area, and wherein the locations of the second set of broadcast sources are selected based on the simulated location of the first user device; and facilitating a presentation of media from a particular broadcast source of the second set of broadcast sources.

16. The non-transitory machine-readable medium of claim 15, wherein the first geographical area is Earth.

17. The non-transitory machine-readable medium of claim 15, wherein the first geographical area is a fictional location.

18. The non-transitory machine-readable medium of claim 15, wherein the location of the first user device is based on a global positioning system (GPS).

19. The non-transitory machine-readable medium of claim 15, wherein the user characteristics further include activity data that indicates one or more activities associated with the first user device.

20. The non-transitory machine-readable medium of claim 15, wherein the contemporaneous broadcast characteristics includes a prediction of media that a user of the first user device would find of interest.

* * * * *